(12) United States Patent
Priya et al.

(10) Patent No.: US 9,769,031 B2
(45) Date of Patent: Sep. 19, 2017

(54) DIGITAL SERVICE PATH VIEWER

(71) Applicant: Infinera Corporation, Sunnyvale, CA (US)

(72) Inventors: Ratna Priya, Bangalore (IN); Pankaj Mishra, Bangalore (IN); Gaurav Agarwal, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/794,977

(22) Filed: Jul. 9, 2015

(65) Prior Publication Data

US 2016/0352586 A1 Dec. 1, 2016

(51) Int. Cl.

| H04J 14/00 | (2006.01) |
| H04L 12/24 | (2006.01) |
| H04Q 11/00 | (2006.01) |
| H04L 12/725 | (2013.01) |
| H04L 12/751 | (2013.01) |
| H04L 12/851 | (2013.01) |

(52) U.S. Cl.
CPC .......... H04L 41/22 (2013.01); H04L 41/0813 (2013.01); H04L 45/302 (2013.01); H04Q 11/0066 (2013.01); H04L 45/02 (2013.01); H04L 47/245 (2013.01); H04Q 2011/0073 (2013.01); H04Q 2011/0079 (2013.01)

(58) Field of Classification Search
CPC ....... H04Q 11/0062; H04Q 2011/0081; H04Q 2213/1301; H04J 14/02

USPC .......................................................... 398/45
See application file for complete search history.

(56) References Cited

U.S. PATENT DOCUMENTS

| 2006/0092941 | A1* | 5/2006 | Kusama | H04L 12/5695 370/392 |
| 2006/0153562 | A1* | 7/2006 | Dolbec | H04B 10/07 398/20 |
| 2006/0271702 | A1* | 11/2006 | Canali | H04L 12/24 709/238 |
| 2010/0202772 | A1* | 8/2010 | Wei | H04Q 11/0062 398/16 |

* cited by examiner

*Primary Examiner* — Don N Vo
(74) *Attorney, Agent, or Firm* — David L. Soltz

(57) ABSTRACT

A device may obtain first information related to a digital service that may identify a digital path. The digital path may include digital nodes and optical links, of an optical network, to provide the digital service. The device may determine second information based on the first information. The second information may describe a relationship between one or more digital services and one or more digital paths. The device may provide a graphical representation, via a user interface, of the one or more digital paths. The device may provide the second information in relation to the graphical representation. The device may detect a user interaction with the graphical representation. The user interaction may relate to one or more of the digital services and/or one or more of the digital paths. The device may cause the digital nodes and/or the optical links to be configured.

18 Claims, 20 Drawing Sheets

DIGITAL SERVICE PATH VIEWER

RELATED APPLICATION

This application claims priority under 35 U.S.C. §119 to Indian Provisional Application No. 2660/CHE/2015, filed on May 27, 2015, the content of which is incorporated by reference herein in its entirety.

BACKGROUND

In optical networks, signals may be transmitted at various wavelengths, with each wavelength corresponding to a transmission channel. Optical links may connect network nodes so that signals may be transmitted throughout the optical network. A digital path may use a series of network nodes and optical links to connect a source of an optical transmission with a destination for the optical transmission.

SUMMARY

According to some possible implementations, a device may include one or more processors. The one or more processors may obtain first information related to a digital service. The first information may identify a digital path. The digital path may include digital nodes and optical links, of an optical network, to provide the digital service. The digital service may be provided via the digital path. The one or more processors may determine second information based on the first information. The second information may describe a relationship between one or more digital services and one or more digital paths. The digital service may be included in the one or more digital services, and the digital path may be included in the one or more digital paths. The one or more processors may provide a graphical representation, via a user interface, of the one or more digital paths. The one or more processors may provide the second information in relation to the graphical representation of the one or more digital paths. The one or more processors may detect a user interaction with an element of the graphical representation. The element may relate to one or more of the digital services and/or one or more of the digital paths. The one or more processors may cause one or more of the digital nodes and/or the optical links to be configured based on the user interaction.

A computer-readable medium may store one or more instructions that, when executed by one or more processors, cause the one or more processors to obtain first information related to a digital service. The first information may identify a plurality of digital paths. The plurality of digital paths may include digital nodes and optical links, of an optical network, to provide the digital service. The digital service may be provided via a first digital path of the plurality of digital paths. The one or more instructions may cause the one or more processors to determine second information based on the first information. The second information may identify a relationship between one or more digital services and the plurality of digital paths. The one or more instructions may cause the one or more processors to provide a graphical representation of the plurality of digital paths via a user interface. The one or more instructions may cause the one or more processors to provide the second information in relation to the graphical representation of the plurality of digital paths. The one or more instructions may cause the one or more processors to detect a user interaction with an element of the graphical representation. The one or more instructions may cause the one or more processors to cause one or more of the digital nodes to be configured based on the interaction.

A method may include obtaining first information relating to a digital service. The first information may identify a plurality of digital paths. The plurality of digital paths may include digital nodes and optical links, of an optical network, to provide the digital service. The digital service may be provided via a first digital path, of the plurality of digital paths. The method may include determining second information based on the first information. The second information may identify a relationship between two or more of the plurality of digital paths. The method may include providing, via a user interface, a graphical representation of the plurality of digital paths. Elements of the graphical representation may correspond to respective optical links or digital nodes of the plurality of digital paths. The method may include providing, via the user interface, the second information in relation to the graphical representation of the plurality of digital paths. The second information may relate to a particular optical link, of the optical links or a particular digital node, of the digital nodes. The second information may be provided in relation to a portion of the graphical representation corresponding to the particular optical link or the particular digital node.

DETAILED DESCRIPTION

The following detailed description of example implementations refers to the accompanying drawings. The same reference numbers in different drawings may identify the same or similar elements.

Administrators and/or users of an optical network may want to determine information associated with a first digital service, such as a set of digital paths that connect a source digital node of the first digital service with a destination digital node of the first digital service. A digital path, of the set of digital paths, may be a working path, which may be a primary digital path of the first digital service. Other digital paths, of the set of digital paths, may be protection paths, which may be used to carry network traffic for the first digital service when the working path fails to carry network traffic for the network traffic for the first digital service (e.g., based on the working path being preempted by another digital service, based on an outage associated with a digital node and/or an optical link of the working path, etc.).

A particular digital path, of the set of digital paths, may share resources (e.g., optical links of the optical network, digital nodes of the optical network, etc.) with another digital path, corresponding to a second digital service. When a working path of the second digital service fails, network traffic of the second digital service may preempt network traffic of the particular digital path via the other digital path. In this way, the optical network may provide resilience against failure by preempting the lower-priority network traffic of the particular digital path with the higher-priority network traffic of the other digital path due to the failure of the second digital service. This approach to optical network failure resilience may be referred to as a "shared mesh protection" approach.

However, to determine the set of digital paths, the administrators and/or users may need to individually access and/or interpret optical network information of digital nodes and/or optical links included in the set of digital paths, which may be cumbersome, slow, and/or prone to human error. Implementations described herein may provide a user interface that displays a graphical representation of the set of digital paths, the digital nodes, and/or the optical links, from the source digital node of the digital service to the destination digital node of the digital service. Implementations described herein may further enable the administrators and/or users to configure the set of digital paths using the user interface, which may simplify design and/or modification of the set of digital paths and/or improve resilience, capacity, and/or efficiency of the optical network by permitting the administrators and/or users to more easily implement the shared mesh protection approach.

Figure 1A:
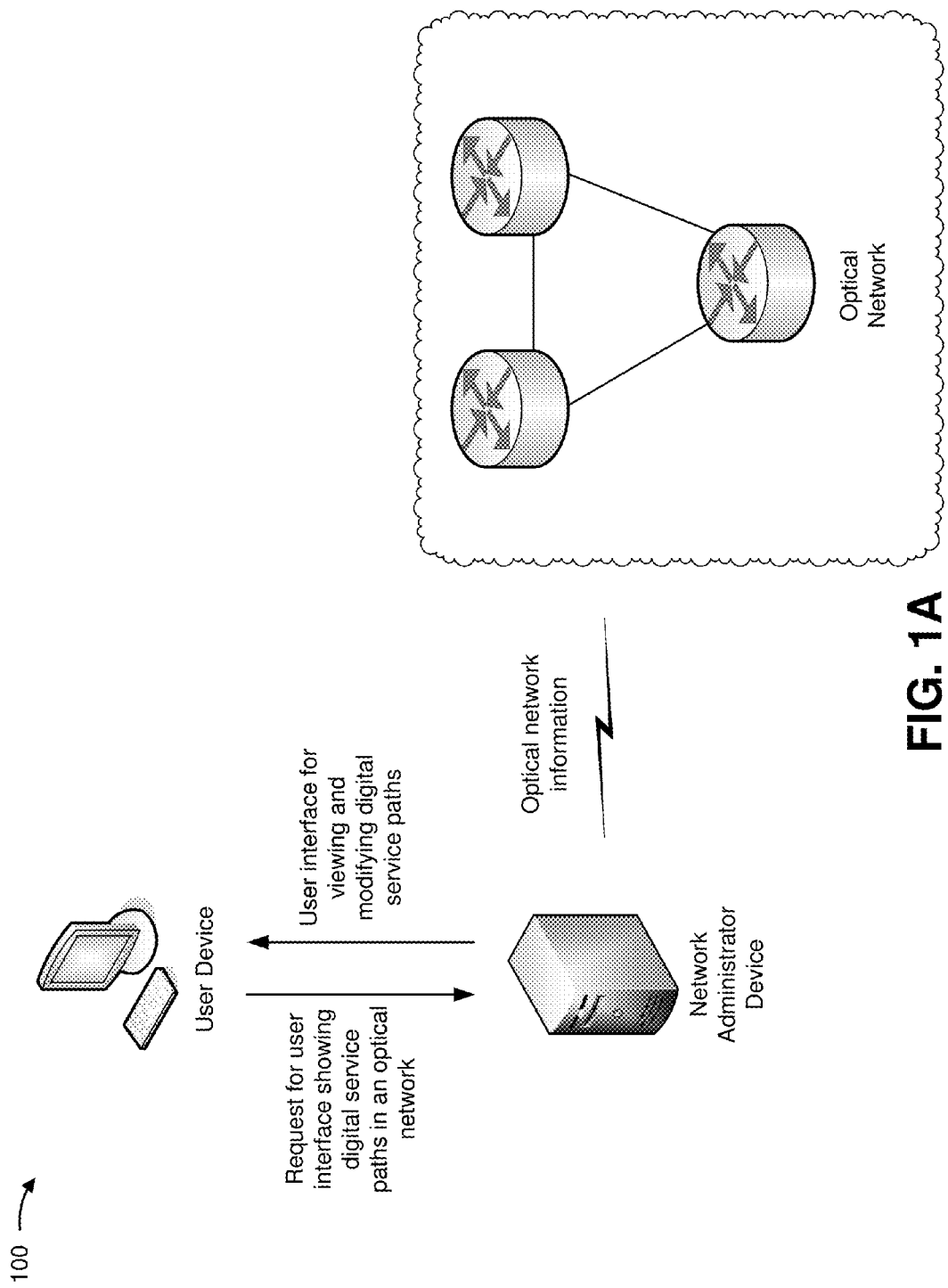
FIGS. 1A and 1B are diagrams of an overview of an example implementation described herein.
Figure 1B:
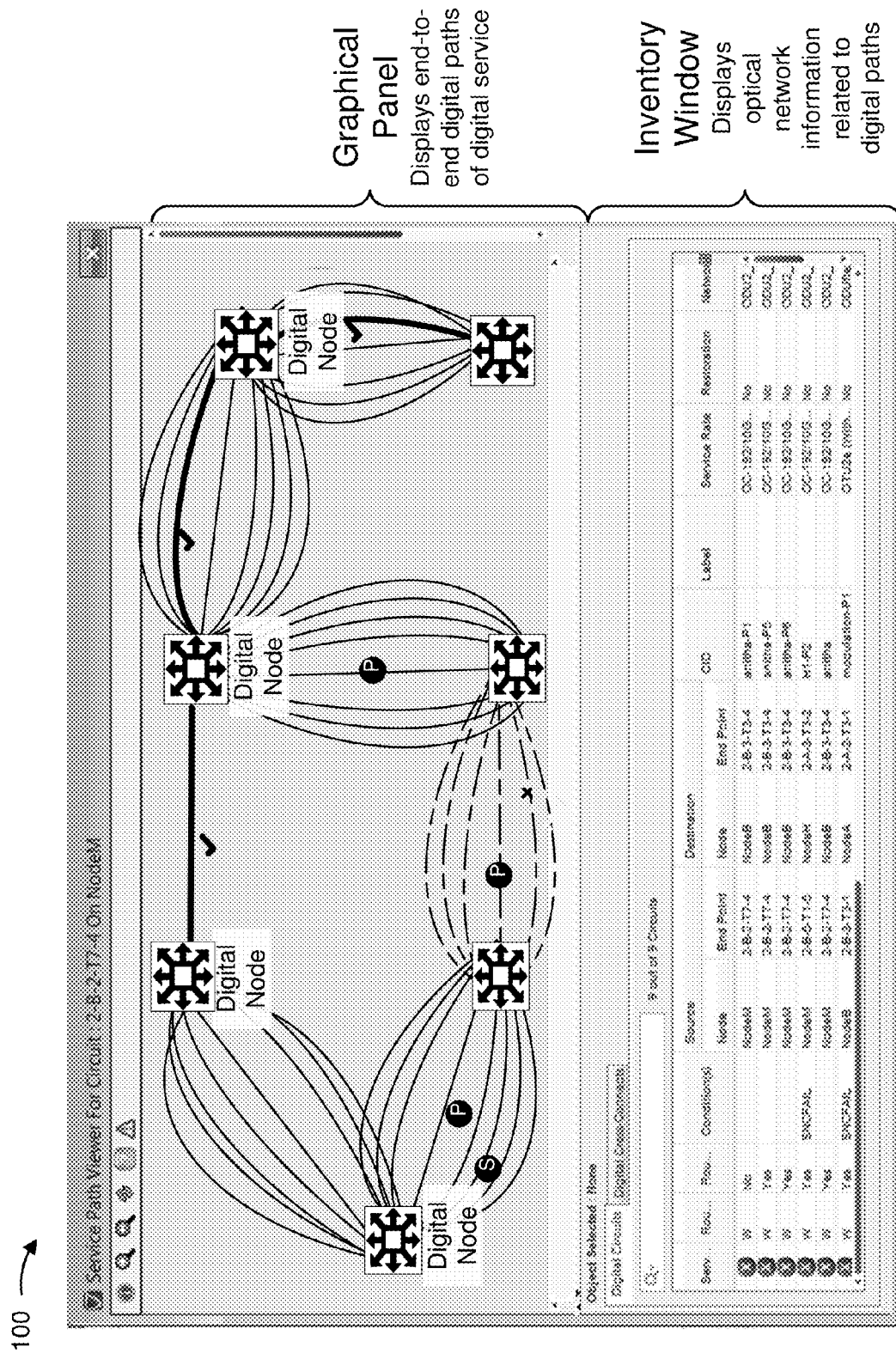

FIGS. 1A and 1B are diagrams of an overview of an example implementation 100 described herein. As shown in FIG. 1A, a user device may request a user interface from a network administrator device. The user interface may show digital paths related to a digital service. The digital paths may show a default set of digital nodes and optical links, of an optical network, to carry network traffic for the digital service (e.g., a "working path") and one or more other sets of digital nodes and optical links, of the optical network, to carry network traffic for the digital service (e.g., one or more "protection paths").

As further shown, the network administrator device may obtain optical network information (e.g., from digital nodes of the optical network). In some cases, the network administrator device may store the optical network information, and may provide the user interface based on the stored optical network information. In some cases, the network administrator device may obtain the optical network information based on receiving the request for the user interface, and may provide the user interface based on the obtained optical network information.

As shown in FIG. 1B, the user interface may include a graphical panel and an inventory window. As shown, the graphical panel may display end-to-end digital paths associated with the digital service. In other words, the graphical panel may display the working path and the one or more protection paths, from a source digital node of the digital service to a destination digital node of the digital service. As further shown, the graphical panel may include visual indicators of optical network information (e.g., a "P" icon, an "S" icon, an "x" icon, a check mark, different line weights, different line patterns, etc.), as described in more detail elsewhere herein.

As shown, the inventory window may provide information related to digital services. For example, the inventory window may provide an indication of whether a digital service is associated with a particular source digital node and/or a particular destination digital node, whether a given digital node and/or optical link is carrying network traffic for a digital service, a bandwidth requirement for the digital service, or other information, as described in more detail elsewhere herein.

A user (e.g., an administrator, etc.) may change the optical network information that is provided for display in the graphical panel and/or the inventory window. For example, the user may modify one or more digital paths, may add and/or remove protection paths, may increase and/or decrease priorities associated with digital services, may re-route network traffic for a digital service from a first digital path to a second digital path, or may perform other operations, as described in more detail elsewhere herein. The network administrator device may cause digital nodes of the optical network to be configured based on the user-specified change.

In this way, the network administrator device may provide a user interface that includes an end-to-end graphical representation of a set of digital paths for a digital service, which may decrease a quantity of time and/or effort needed to determine the set of digital paths. The network administrator device, or another device, may modify digital nodes based on user-specified changes that are received via the user interface, which may simplify network administration, improve resilience, bandwidth, and/or efficiency of the network, reduce time used for planning and/or modifying the set of digital paths, and/or reduce likelihood of human error when modifying the digital paths.

Figure 2:
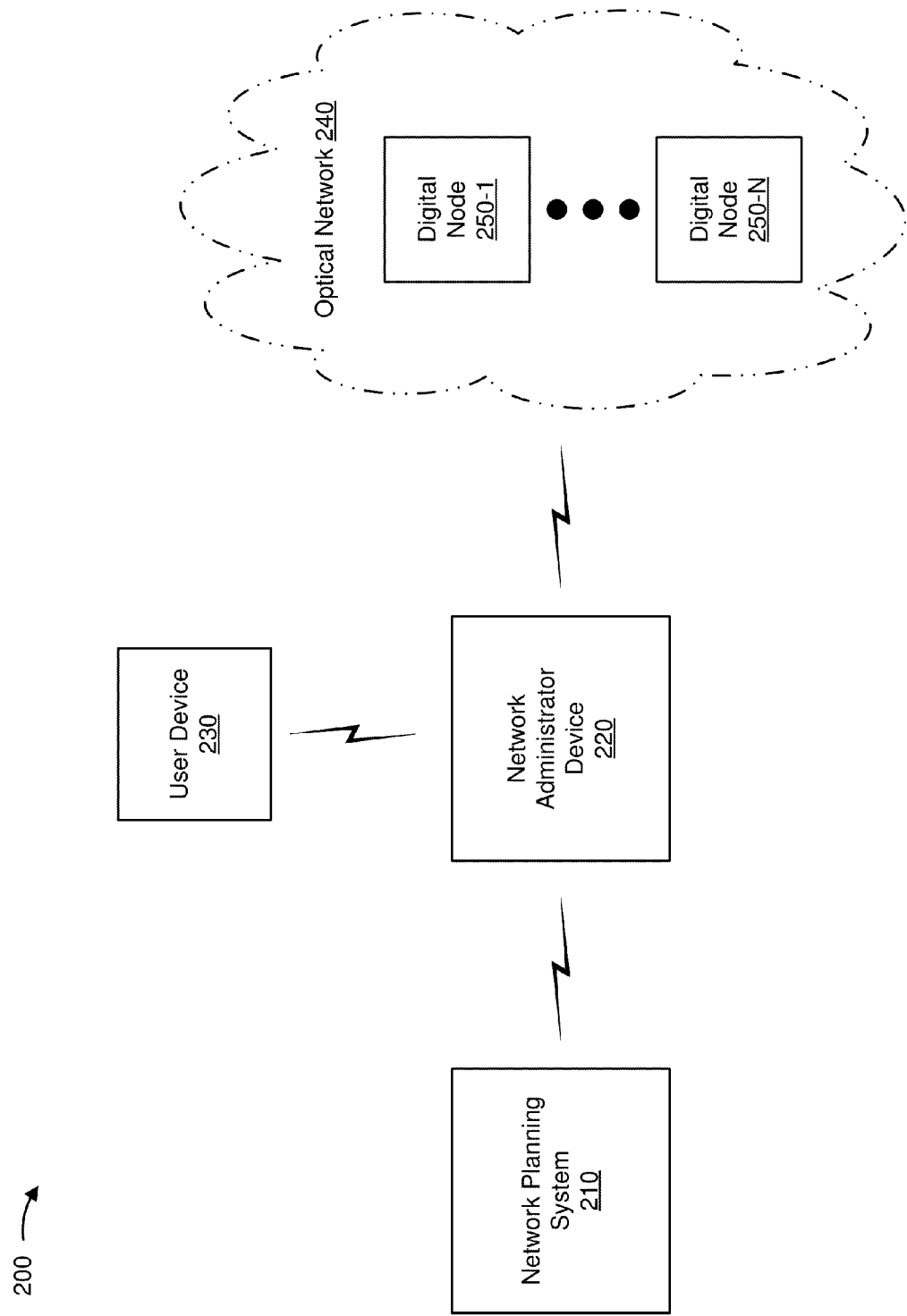
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network planning system 210, a network administrator device 220, a user device 230, an optical network 240, and one or more digital nodes 250-1 through 250-N (N≥1) (hereinafter referred to collectively as "digital nodes 250," and individually as "digital node 250"). Devices of environment 200 may interconnect via wired connections, wireless connections, or a combination of wired and wireless connections.

Network planning system 210 may include one or more devices capable of receiving, generating, storing, processing, and/or providing optical network information. For example, network planning system 210 may include a computing device, such as a server, a group of servers, or a similar type of device. Network planning system 210 may assist a user in modeling and/or planning an optical network, such as optical network 240. For example, network planning system 210 may assist in modeling and/or planning an optical network configuration, which may include quantities, locations, capacities, parameters, and/or configurations of digital nodes 250, characteristics and/or configurations (e.g., capacities) of optical links between digital nodes 250, traffic demands of digital nodes 250 and/or optical links between digital nodes 250, and/or any other network information associated with optical network 240 (e.g., digital node configurations, digital device configurations, etc.). Network planning system 210 may provide optical network information, associated with optical network 240, to network administrator device 220 so that a user may view, modify, and/or interact with the optical network information.

Network administrator device 220 may include one or more devices capable of receiving, generating, storing, processing, and/or providing optical network information. For example, network administrator device 220 may include a computing device, such as a server, a group of servers, a desktop computer, a laptop computer, or the like. In some implementations, network administrator device 220 may receive optical network information (e.g., from one or more devices shown in FIG. 2), and may provide the optical network information for display via a user interface. Additionally, or alternatively, network administrator device 220 may provide the optical network information to another device, such as user device 230, for display via a user interface. In some implementations, network administrator device 220 may receive (e.g., from user device 230) modified optical network information, and may use the modified optical network information to cause one or more digital nodes 250 to be configured based on the modified optical network information.

User device 230 may include one or more devices capable of receiving, generating, storing, processing, and/or providing optical network information. For example, user device 230 may include a computing device, such as a desktop computer, a laptop computer, a tablet computer, a mobile phone (e.g., a smart phone, a radiotelephone, etc.), a handheld computer, or the like. In some implementations, user device 230 may receive optical network information from and/or transmit information to another device in environment 200. User device 230 may provide the optical network information for display via a user interface, and may provide an input mechanism for a user to modify optical network information. User device 230 may provide the modified optical network information to one or more digital nodes 250 (e.g., via network administrator device 220) to cause the modification to be implemented in optical network 240.

Optical network 240 may include any type of network that uses light as a transmission medium. For example, optical network 240 may include a fiber-optic based network, an optical transport network, a light-emitting diode network, a laser diode network, an infrared network, and/or a combination of these or other types of optical networks. Optical network 240 may include one or more optical routes (e.g., optical lightpaths), that may specify a path along which light is carried (e.g., using one or more optical links) between two or more digital nodes 250. An optical link may include an optical fiber, an optical channel, an optical super-channel, a super-channel group, an optical carrier group, a set of spectral slices, an optical control channel, an optical data channel, or the like.

In some implementations, an optical link may include a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

Digital node 250 may include one or more devices capable of receiving, generating, storing, processing, and/or providing data, carried by an optical signal, via an optical link. For example, digital node 250 may include one or more optical data processing and/or optical traffic transfer devices, such as an optical amplifier (e.g., a doped fiber amplifier, an erbium doped fiber amplifier, a Raman amplifier, etc.), an optical add-drop multiplexer ("OADM") (e.g., a reconfigurable optical add-drop multiplexer ("ROADM"), a flexibly reconfigurable optical add-drop multiplexer ("FROADM"), etc.), an optical source device (e.g., a laser source), an optical destination device (e.g., a laser sink), an optical multiplexer, an optical demultiplexer, an optical transmitter, an optical receiver, an optical transceiver, a photonic integrated circuit, an integrated optical circuit, or the like. In some implementations, digital node 250 may include one or more optical components. Digital node 250 may process and/or transmit an optical signal (e.g., to another digital node 250 via an optical link) to deliver the optical signal through optical network 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
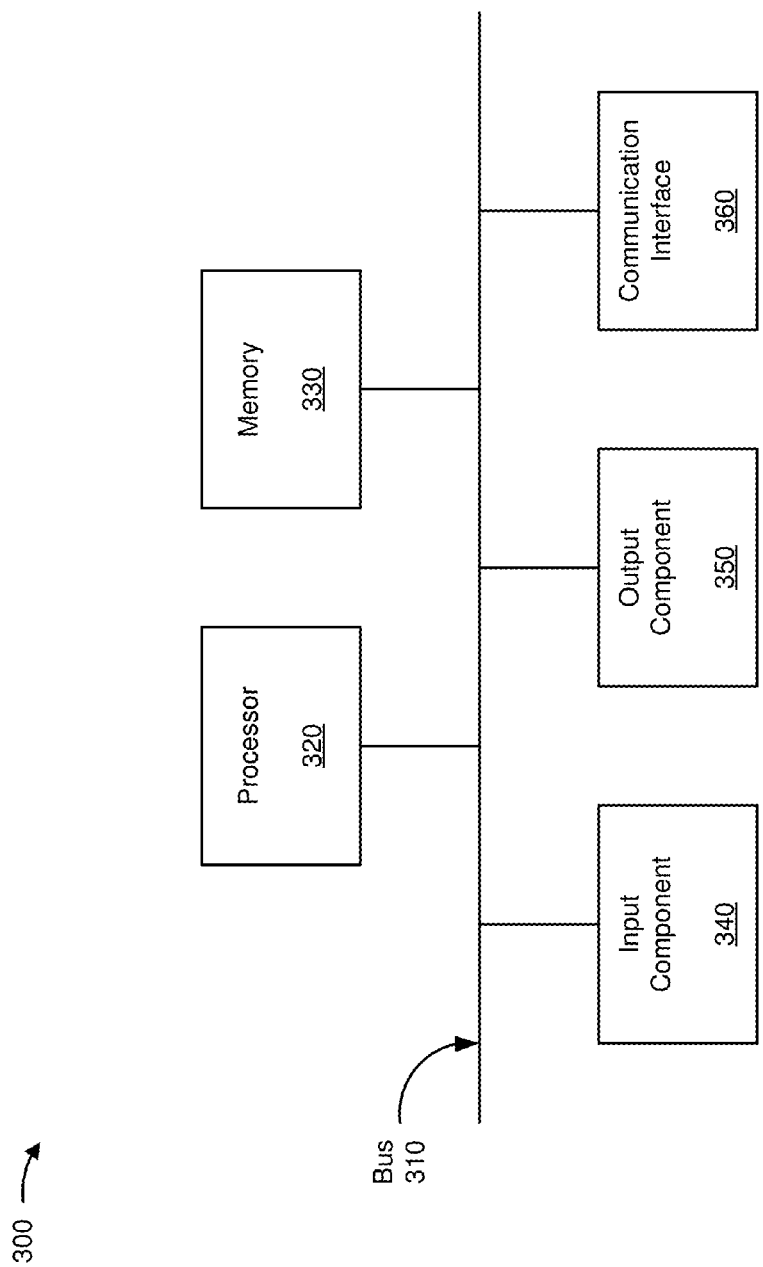
FIG. 3 is a diagram of example components of one or more devices of FIG. 2.

FIG. 3 is a diagram of example components of a device 300. Device 300 may correspond to network planning system 210, network administrator device 220, user device 230, and/or digital node 250. In some implementations, network planning system 210, network administrator device 220, user device 230, and/or digital node 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
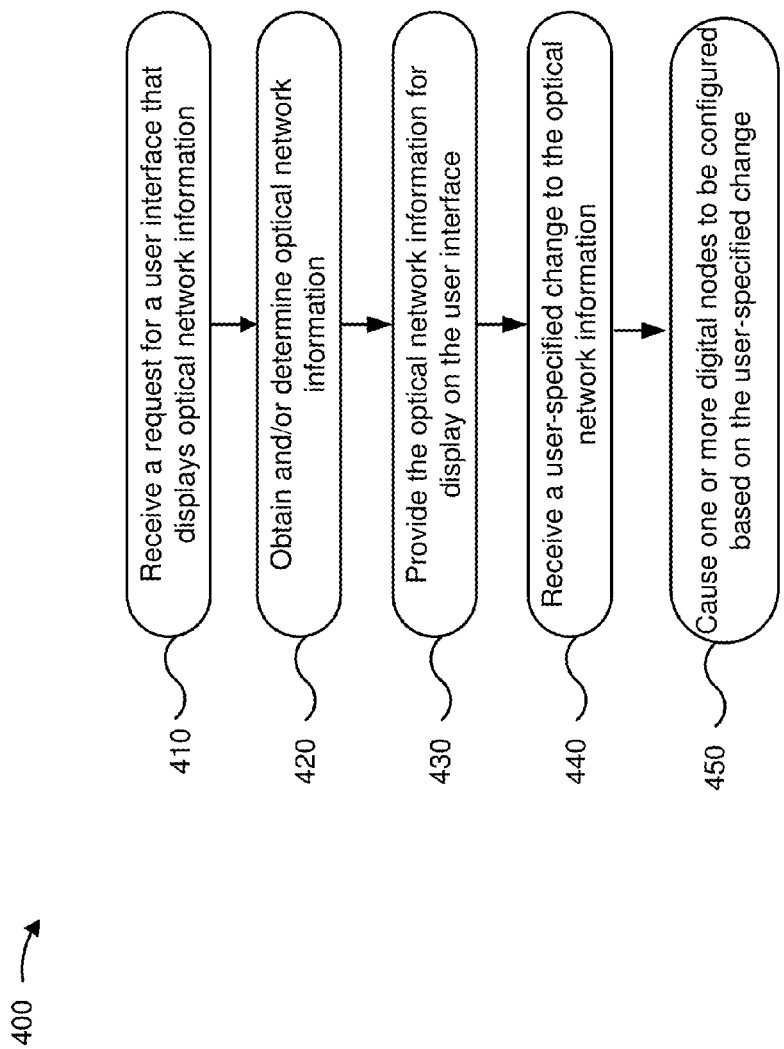
FIG. 4 is a flow chart of an example process for providing a user interface that displays digital paths of a digital service.

FIG. 4 is a flow chart of an example process 400 for providing a user interface that displays digital paths associated with a digital service. In some implementations, one or more process blocks of FIG. 4 may be performed by network administrator device 220 and/or user device 230. In some implementations, one or more process blocks of FIG. 4 may be performed by another device or a group of devices separate from or including network administrator device 220 and/or user device 230, such as network planning system 210 and/or digital node 250.

As shown in FIG. 4, process 400 may include receiving a request for a user interface that displays optical network information (block 410). For example, network administrator device 220 may receive a request for a user interface that displays optical network information. In some implementations, network administrator device 220 may receive the request from user device 230. In some implementations, the request for the user interface may specify one or more digital services for which to provide optical network information. For example, the one or more digital services may be specified based on an interaction with a user interface, such as a button, a clickable element, a text box, a drop-down menu or box, a link, or the like.

The optical network information may include information associated with optical network 240, such as information associated with one or more digital nodes 250, one or more optical components included in one or more digital nodes 250, one or more optical super-channels carried by one or more optical components, one or more optical channels (e.g., optical carriers) included in one or more optical super-channels, one or more optical links between digital nodes 250, or the like.

In some implementations, the optical network information may be associated with a digital service. For example, the optical network information may identify digital paths associated with the digital service (e.g., digital nodes 250 and/or optical links between the digital nodes 250 to carry network traffic for the digital service).

As further shown in FIG. 4, process 400 may include obtaining and/or determining optical network information (block 420). For example, network administrator device 220 may obtain and/or determine optical network information (e.g., from network planning system 210, from locally stored optical network information, from one or more digital nodes 250, etc.). In some implementations, network administrator device 220 may request and/or receive the optical network information on a periodic basis (e.g., every second, every minute, every hour, every day, every week, when output by a digital node 250, etc.).

Additionally, or alternatively, network administrator device 220 may request and/or receive the optical network information based on input received from a user (e.g., a user request for the optical network information). Additionally, or alternatively, network planning system 210 and/or digital node 250 may automatically provide the optical network information to network administrator device 220 (e.g., on a periodic basis, when the optical network information is modified, etc.). Additionally, or alternatively, network administrator device 220 may determine optical network information based on received optical network information.

In some implementations, network administrator device 220 may store the optical network information. For example, network administrator device 220 may store the optical network information in a memory accessible by network administrator device 220. In some implementations, network administrator device 220 may store the optical network information in a data structure.

In some implementations, network administrator device 220 may determine optical network information. For example, network administrator device 220 may determine whether a particular optical link can carry network traffic for a digital service based on a capacity of the optical link, one or more digital nodes 250 to which the optical link is connected, a physical location of the optical link, physical locations of the one or more digital nodes 250, or the like. When a particular optical link can carry network traffic for a digital service, the particular optical link may be referred to, for example, as an "available link" or a "standby link." When the particular optical link cannot carry network traffic for the optical service, the particular optical link may be referred to, for example, as an "unavailable link." When a particular optical link is carrying network traffic for a digital service, the particular optical link may be referred to, for example, as an "active link." Network administrator device 220 may provide information indicating whether optical links are available links, unavailable links, standby links, active links, etc. via a user interface, as described in more detail below.

In some implementations, network administrator device 220 may determine optical network information that identifies a priority level of a digital service relative to other digital services. A digital service of a higher priority level may receive preference over a digital service of a lower priority level when allocating optical network resources. For example, when a first digital service, of a higher priority level, and a second digital service, of a lower priority level, share an optical link, a super-channel, or the like, network traffic related to the first digital service may be transmitted before network traffic related to the second digital service. Additionally, or alternatively, transmission of network traffic related to the second digital service may be interrupted and/or delayed until transmission of the network traffic related to the first digital service is complete.

In some implementations, network administrator device 220 may determine optical network information related to a digital service. For example, network administrator device 220 may determine that the digital service shares a super-channel with one or more other digital services, which may be referred to herein as a "shared path." As another example, network administrator device 220 may determine that the digital service shares a super-channel with a digital service of a higher priority. Such a shared path may be referred to herein as a "preemptible path." Network administrator device 220 may provide information indicating whether optical links are associated with shared paths and/or preemptible paths via a user interface, as described in more detail below.

As another example, network administrator device 220 may determine that a digital service can be provided via two or more digital paths. For example, a digital service may be provided via a first digital path (e.g., a first set of optical links and/or digital nodes 250). When an optical link and/or a digital node 250 of the first digital path fails, the digital service may be delayed or dropped, unless the digital service can be provided via a second digital path (e.g., a second set of optical links and/or digital nodes 250, of which one or more of the optical links and/or digital nodes 250 are different than those of the first set). In a situation where the digital service may be provided via the first digital path and the second digital path, the first digital path and/or the second digital path may be referred to as "protected paths."

As another example, network administrator device 220 may determine a relationship between a primary digital path and a secondary digital path for a digital service. For example, the secondary digital path may provide redundancy for the primary digital path. In a situation where an optical link and/or a digital node 250 of the primary digital path fails, the digital service may be provided via the secondary digital path. The primary digital path may be referred to herein as a "working path," and the secondary digital path may be referred to herein as a "protection path." Network administrator device 220 may provide information identifying shared paths, preemptible paths, working paths, protection paths, and/or protected paths via a user interface, as described in more detail below.

As further shown in FIG. 4, process 400 may include providing the optical network information for display on the user interface (block 430). For example, user device 230 may provide the requested optical network information for display on a user interface. In some implementations, the user interface may be divided into different sections (e.g., windows, tabs, frames, areas, etc.), and each section may present, for example, different optical network information and/or optical network information in a different format. In some implementations, the user interface may facilitate an interaction to receive a user-specified change to the optical network information, as described in more detail below.

The user interface may present the optical network information. In some implementations, the user interface may provide information related to a particular digital service and/or a set of optical links and/or digital nodes 250. For example, the user interface may provide a graphical representation of the set of optical links and/or digital nodes 250, and may provide optical network information in relation to the graphical representation of the set of optical links and/or digital nodes 250, as described in more detail below.

In some implementations, the user interface may include a toolbar. The toolbar may provide tools for manipulating information displayed on the user interface (e.g., a zoom tool, a tool to refresh information displayed on the user interface, a tool to receive additional information regarding a displayed element of the user interface, a tool to receive help information regarding the user interface, etc.). In some implementations, the toolbar may provide a warning related to information provided via the user interface. For example, the toolbar may include a user interface (UI) element that indicates that digital node 250 is improperly configured, that one or more optical links are unavailable links, that a particular digital service is not associated with a protected path, or the like.

In some implementations, the user interface may include a graphical panel. The graphical panel may include a graphical representation of a set of digital nodes 250 and/or optical links between the digital nodes 250. In some implementations, the graphical panel may display, in association with the digital nodes 250 and/or optical links, optical network information. For example, if an optical link is included in a shared path, a preemptible path, a working path, a protection path, a protected path, or the like, the graphical panel may display a line representing the optical link in association with a particular icon, in a particular color, in a particular pattern, in a particular line thickness, or the like.

In some implementations, a user interface element related to modifying the optical network information may be provided via the graphical panel. For example, when a user interacts with an optical link, a digital node 250, or the like, the user interface may display a menu in association with the optical link, the digital node 250, or the like. The menu may provide a button, a link, a drop down menu, a textual input window, or the like, via which a user may provide a user-specified change to optical network information associated with the optical link, the digital node 250, or the like. In this way, the user interface may facilitate modification of the optical network information via the graphical panel, which may improve bandwidth and/or efficiency of the optical network, and may reduce human errors related to the modification.

In some implementations, the user interface may include an inventory window. The inventory window may provide optical network information in a textual format. For example, the inventory window may display a spreadsheet, a matrix, an array, a table, or the like, that includes the optical network information. The inventory window may identify a digital service, and may provide optical network information associated with the digital service (e.g., in a row/column of a spreadsheet associated with the digital service, in a row/column of a table associated with the digital service, etc.).

The optical network information displayed in the inventory window may include, for example, a source digital node 250 and/or a destination digital node 250 of a digital service, a priority associated with the digital service, information indicating whether the digital service is operational, interrupted, inactive, etc., a capacity and/or bandwidth associated with the digital service (e.g., OC-1, OC-3, OC-24, OC-192/10 Gbps, etc.), a network mapping (e.g., OTU1, OTU2, ODU0, ODU1, ODUflex, etc.), a circuit identifier (e.g., that identifies a particular optical networking path for the digital service), a label (e.g., an automatically generated label, a user-specified label, etc.) of an optical link associated with a digital service, an indicator of whether a digital service is active on a particular optical link, information related to a shared risk resource group (e.g., a shared risk link group identifier, etc.), information related to a failure of a portion of a digital path (e.g., an optical link and/or digital node 250 associated with the digital path), information related to restoring functionality of an optical link and/or a digital node 250 associated with the digital service (e.g., a status of restoring functionality, a constraint, such as a time constraint, of restoring functionality, etc.), or the like.

In some implementations, the optical network information displayed in the inventory window may be associated with a particular digital service, a particular digital node 250, and/or a particular optical link. For example, if a user specifies a particular optical link, the optical network information may identify and/or relate to digital services carried via the particular optical link.

As another example, if a user specifies a particular digital node 250, the optical network information may relate to the particular digital node 250 (e.g., information related to routing optical signals via the particular digital node 250, one or more digital services for which network traffic is carried via the particular digital node 250, one or more digital services that originate at or end at the particular digital node 250, a bandwidth and/or capacity of the particular digital node 250, other digital nodes 250 connected to the particular digital node 250, an operational state of the particular digital node 250, information related to a shared risk resource group (e.g., a shared risk node group identifier, etc.)).

In some implementations, the user interface may include information displayed based on a user interaction. For example, a user may interact with a particular user interface element by hovering a mouse pointer over the particular user interface element, and the user interface may display optical network information in relation to the particular user interface element (e.g., in a text box, in a tooltip, in a graphical element, etc.), as described in more detail in connection with FIGS. 5B and 6, below.

As further shown in FIG. 4, process 400 may include receiving a user-specified change to the optical network information (block 440). For example, network administrator device 220 may receive a user-specified change to the optical network information. Network administrator device 220 may receive the user-specified change via the user interface. For example, a user may interact with an element of the user interface to specify the user-specified change. In some implementations, network administrator device 220 may receive the user-specified change based on a user interaction with a user interface of user device 230. For example, user device 230 may receive the user-specified change, and may provide the user-specified change to network administrator device 220.

A user-specified change may relate to configuring optical network 240, in some implementations. For example, the user-specified change may relate to re-routing network traffic for a digital service, changing a priority level associated with a digital service, activating or deactivating one or more optical links and/or digital nodes 250, changing a digital path of a digital service, or the like. Network administrator device 220 may receive the user-specified change based on a user interaction with the toolbar, the graphical panel, and/or the inventory window. For example, the user interaction may include a textual input, a mouse click, a selection from a drop-down menu, a click-and-drag interaction, etc., with the toolbar, the graphical panel, and/or the inventory window.

In some implementations, the user interaction may relate to adding and/or removing one or more protection paths. For example, if a particular digital service is associated with one working path and no protection paths, network administrator device 220 may receive a user-specified change to add a protection path. As another example, a user may specify to remove a protection path. For example, a user may cause network administrator device 220 to remove all working paths and protection paths associated with a particular optical link (e.g., to facilitate maintenance of the particular optical link).

In some implementations, the user interaction may relate to routing network traffic for a digital service via a particular digital path. For example, a first user-specified change may indicate to shut down a particular digital path if network traffic for one or more digital services, associated with the particular digital path, can be routed via another digital path. This first user-specified change may be referred to herein as a "forced switch." As another example, a second user-specified change may indicate to shut down a particular digital path, irrespective of whether network traffic for digital services, associated with the particular digital path, can be routed via another digital path. This second user-specified change may be referred to herein as a "lockout." As another example, a third user-specified change may indicate to move a digital service from a first digital path to a second digital path, and the first digital path and/or the second digital path may be specified in the user-specified change. This third user-specified change may be referred to herein as a "manual switch." In some implementations, the user-specified change may relate to undoing a lockout, a forced switch, and/or a manual switch.

In some implementations, network administrator device 220 may obtain additional optical network information in association with determining the network configuration information. For example, network administrator device 220 may obtain updated optical network information (e.g., from network planning system 210, from digital node 250, etc.) when determining the network configuration information, which may improve accuracy and/or reduce likelihood of errors in the network configuration information.

As further shown in FIG. 4, process 400 may include causing one or more digital nodes to be configured based on the network configuration information (block 450). For example, network administrator device 220 may cause one or more digital nodes 250 to be configured based on the user-specified change. In some implementations, network administrator device 220 may cause the one or more digital nodes 250 to be configured by transmitting network configuration information to the one or more digital nodes 250. In some implementations, network administrator device 220 may cause the one or more digital nodes 250 to be configured by providing the network configuration information to another device, such as network planning system 210 that provides the network configuration information to the one or more digital nodes 250.

Network administrator device 220 may determine network configuration information based on the user-specified change and/or the optical network information. For example, if the user-specified change relates to adding a protected path, network administrator device 220 may identify an optical link and/or a channel between digital nodes 250 via which to provide the added protected path, and the network configuration information may cause the digital nodes 250 to provide the protected path via the optical link and/or the channel.

In some implementations, network administrator device 220 may analyze the user-specified change to determine whether the user-specified change can be implemented in optical network 240. For example, network administrator device 220 may determine whether digital nodes 250 may be configured to add a protecting path, whether optical network 240 is capable of providing network traffic for a digital service at a required bandwidth and/or with less than a particular latency, may determine an impact of the user-specified instruction on other digital nodes 250 and/or optical links, or the like.

Based on analyzing the user-specified change, network administrator device 220 may cause digital nodes 250 to be configured, or may not cause digital nodes 250 to be configured. If the user-specified change cannot be implemented, network administrator device 220 may provide information (e.g., via the user interface) indicating that the user-specified change cannot be implemented.

In some implementations, network administrator device 220 may generate network configuration information based on a particular digital node 250. For example, assume that a first digital node 250 reads network configuration information in a first format, and assume that a second digital node 250 reads network configuration information in a second format. In some implementations, network administrator device 220 may identify the first format and/or the second format, and may generate and/or provide network configuration in the first format and/or the second format accordingly. In this way, network administrator device 220 may configure a variety of digital nodes 250, which may improve versatility of network administrator device 220.

In some implementations, network administrator device 220 may obtain additional optical network information in association with determining the network configuration information. For example, network administrator device 220 may obtain updated optical network information when determining the network configuration information, which may improve efficiency and/or bandwidth of optical network 240 by improving accuracy and/or reducing likelihood of errors in the network configuration information.

Figure 5A:
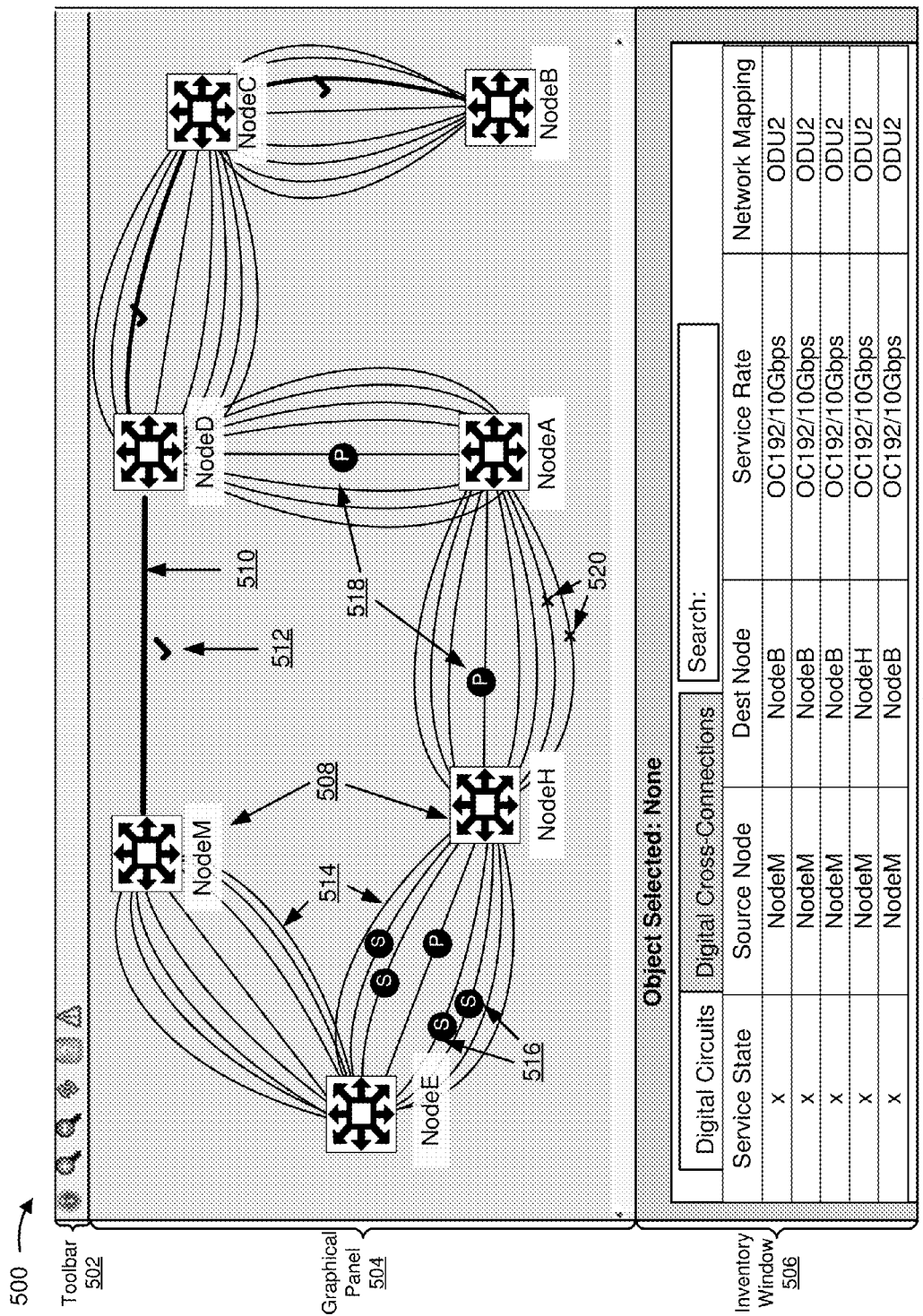
FIGS. 5A and 5B are diagrams of an example implementation relating to the example process shown in FIG. 4.
Figure 5B:
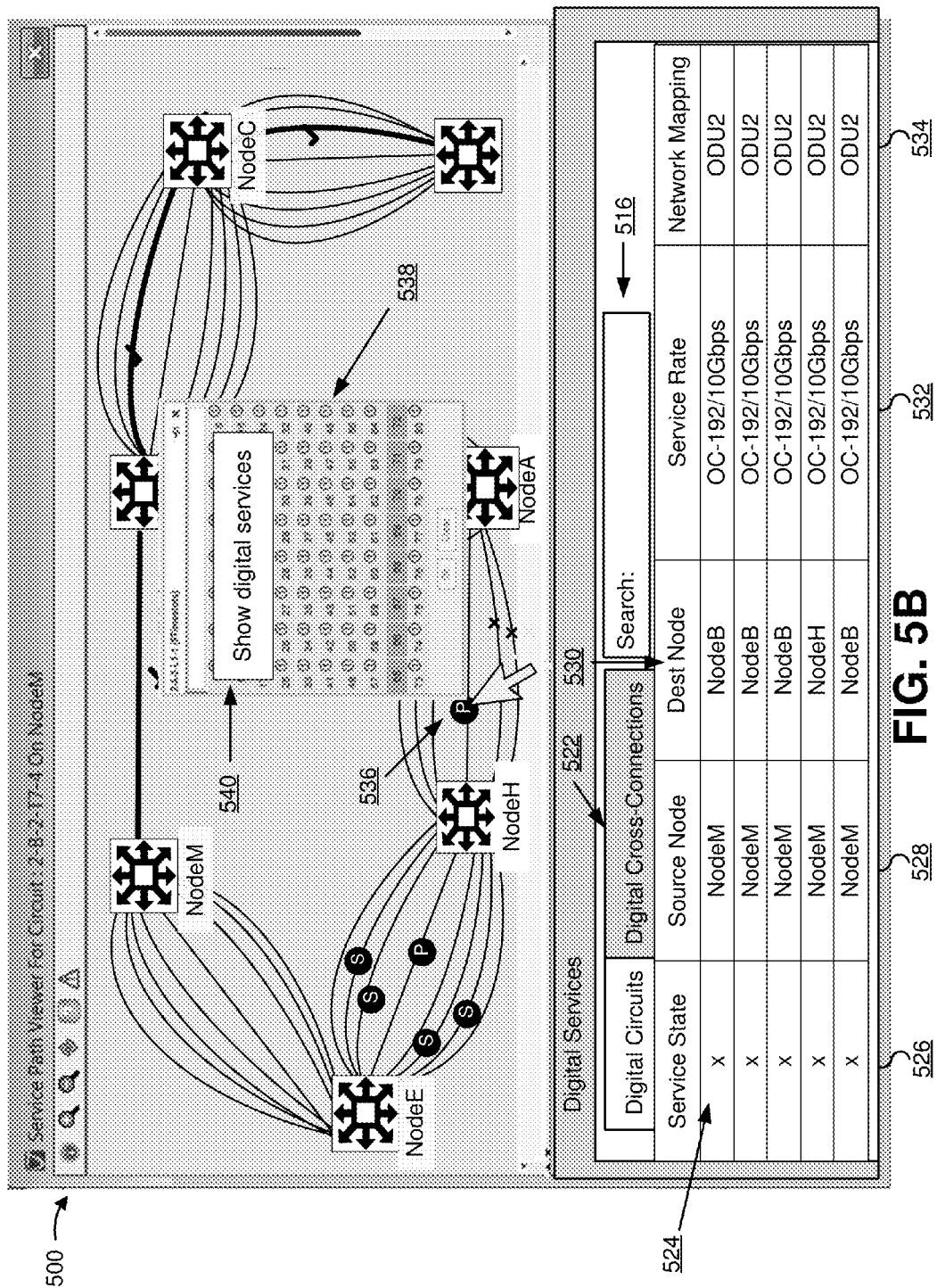

FIGS. 5A and 5B are diagrams of an example user interface 500 relating to example process 400 shown in FIG. 4. FIGS. 5A and 5B show an example of a user interface that displays digital paths for a digital service. For the purposes of FIGS. 5A and 5B, assume that a user specifies a digital service that originates at a digital node 250 of "NodeM," continues through digital nodes 250 of "NodeD" and NodeC," and ends at a digital node 250 of "NodeB."

As shown in FIG. 5A, user interface 500 may include a toolbar 502, a graphical panel 504, and an inventory window 506. As shown, toolbar 502 may include one or more user interface elements for interacting with the displayed optical network information. Here, toolbar 502 includes a user interface element to obtain additional information about displayed optical network information (e.g., a button including an "i"), a user interface element to increase a level of magnification of graphical panel 504 (e.g., a button including a magnifying glass with a "+" sign), a user interface element to decrease a level of magnification of graphical panel 504 (e.g., a button including a magnifying glass with a "−" sign), a user interface element to obtain updated optical network information (e.g., a refresh button), a user interface element to obtain help information (e.g., a button including a "?" symbol), and a warning (e.g., a triangular button including a "!").

As shown, graphical panel 504 may display a graphical representation of optical network information. Graphical panel 504 may display digital nodes 250, as shown by reference number 508 (e.g., a first digital node 250 of NodeM, a second digital node 250 of NodeD, etc.). Digital paths, from the source digital node 250 of NodeM to the destination digital node 250 of NodeB, are shown by lines, such as those shown by reference numbers 510 and 514. As shown by reference number 510, a working path from NodeM to NodeB is shown by a bold line, beginning at NodeM and continuing through NodeD and NodeC to NodeB. As shown by reference number 512, a protected path indicator may be displayed, in relation to the working path, to indicate that the working path is a protected path. Here, the protected path indicator is a check mark.

As shown by reference number 514, protection paths of the working path may be denoted, for example, by lines of a different line weight than the lines denoting the working path. Here, the protection paths begin at NodeM and continue through NodeE, NodeH, NodeA, NodeD, and NodeC, to end at NodeB. Certain optical links, via which one or more of the protection paths are associated, may be shared with other digital services. For example, here, four optical links between NodeE and NodeH are shared with other digital services. As shown by reference number 516, the four shared optical links are denoted by a shared path indicator (e.g., a circle, including an "S").

As shown by reference number 518, some shared optical links may be preemptible links, and may be shared with a digital service that is associated with a higher priority than the digital service of FIGS. 5A and 5B. Such preemptible links may be denoted by a preemption indicator (e.g., a circle, including a "P"). As shown by reference number 520, some optical links, of protection paths, may be unavailable for the digital service, and may be denoted by an unavailability indicator (e.g., an "x"). For example, the unavailable optical links may be associated with a physical optical fiber outage, may carry network traffic for a digital service that preempts the digital service of FIGS. 5A and 5B, or the like.

As shown in FIG. 5B, inventory window 506 may provide optical network information related to digital services of optical network 240. In some implementations, inventory window 506 may provide optical network information for digital services related to a particular optical link, a particular digital node 250, or the like. As shown by reference number 520, inventory window 506 may provide a search interface for searching the optical network information, which may permit a user to quickly find optical network information for a particular digital service. As shown by reference number 522, inventory window 506 may provide an interface element (e.g., tabs, buttons, etc.) for switching between optical network information related to optical links and/or digital paths (e.g., "Digital Circuits"), and information related to routing network traffic via digital nodes 250 (e.g., "Digital Cross-Connections").

As shown by reference number 524, inventory window 506 may provide optical network information for digital services in a table, in some implementations. As shown by reference number 528, the table may identify a service state of a digital service (e.g., an "x," corresponding to an inactive state). The table may identify a source digital node 250 of digital services, as shown by reference number 528. The table may further identify destination digital nodes 250 of digital services, as shown by reference number 528. As shown by reference number 528, the table may identify a capacity associated with a digital service (e.g., "Service Rate," including values of "OC-192/10 Gbps"). As shown by reference number 530, the table may identify a network mapping associated with a digital service (e.g., "ODU2").

As shown by reference number 532, a user may interact with an element of the graphical representation to receive additional optical network information related to the element. Here, as shown, a user interacts with a preemption indicator. Based on the interaction, network administrator device 220 may provide additional optical network information related to the preemptible path. As shown by reference number 534, the additional optical network information may include information related to time-division multiplexing of the preemptible path. The additional optical network information may identify one or more other digital services that may preempt the digital service of FIGS. 5A and 5B, and may identify a division of time slots, in the optical link associated with the preemption indicator, between the particular digital service and the one or more other digital services.

As shown by reference number 536, the user interface may provide the additional optical network information in association with an element (e.g., a button, etc.). If network administrator device 220 detects an interaction with the element, network administrator device 220 may provide optical network information (e.g., via inventory window 506) of digital services that may preempt the particular digital service between NodeA and NodeH. In this way, a network operator may interact with user interface 500 to determine which protection paths are susceptible to preemption, which may improve efficiency of planning network services and/or improve resilience of optical network 240.

As indicated above, FIGS. 5A and 5B are provided merely as an example. Other examples are possible and may differ from what was described with regard to FIGS. 5A and 5B. For example, protected path indicators, preemption indicators, shared path indicators, unavailability indicators, or the like, may use different indicators (e.g., different colors, different line patterns, labels, etc.).

Figure 6:
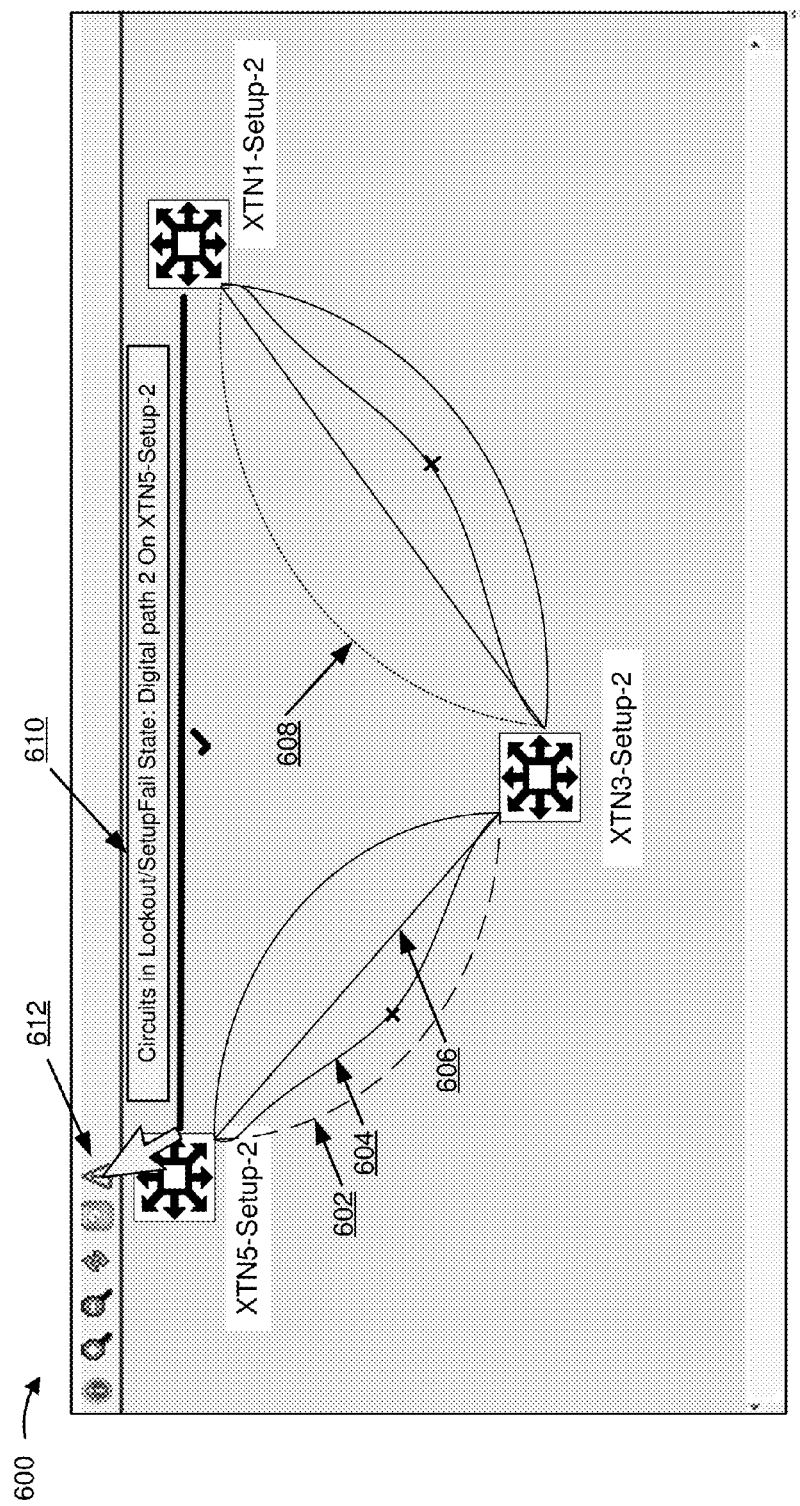
FIG. 6 is a diagram of an example implementation relating to the example process shown in FIG. 4.

FIG. 6 is a diagram of an example implementation 600 relating to example process 400 shown in FIG. 4 and/or user interface 500 shown in FIGS. 5A and 5B. FIG. 6 shows an example of displaying optical network information related to digital path availability. For the purpose of FIG. 6, assume that the information displayed in the user interface relates to a particular digital service.

As shown in FIG. 6, and by reference number 602, user interface 500 may display a first digital path in association with a first pattern. Here, the first pattern is a dashed pattern. The first digital path may be displayed in association with the first pattern to denote an availability of the first digital path. For example, when the first digital path is in use by the particular optical service, the first digital path may be displayed in the dashed pattern.

As shown by reference number 604, user interface 500 may display a second digital path in association with a particular icon. Here, the second digital path is displayed in association with an "x" icon. The "x" icon may indicate that the second digital path is unavailable. For example, an optical link and/or a digital node 250 associated with the second digital path may be out of service, the second digital path may be associated with a "lockout" command or a "force switch" command provided by a user of user interface 500, or the like.

As shown by reference number 606, user interface 500 may display a third digital path in association with a second pattern. Here, the second pattern is a solid pattern. The third digital path may be displayed in association with the solid pattern to indicate an availability of the third digital path. For example, the solid pattern may indicate that the third digital path is available for use by the particular digital service.

As shown by reference number 608, the user interface may display a fourth digital path in association with a third pattern. Here, the third pattern is a dotted pattern. The fourth digital path may be displayed in association with the dotted pattern to indicate an availability of the fourth digital path. For example, the dotted pattern may indicate that the fourth digital path is in use by the particular digital service, and is preemptible by another digital service on the optical link of the fourth digital path.

As shown by reference number 610, user interface 500 may provide a tooltip when a user interacts with an element of user interface 500. Here, user interface 500 provides a tooltip indicating that a particular digital path is non-functional based on a configuration of the particular digital path. For example, the user interface may indicate that the particular digital path is inactive based on a "lockout" status specified by a user, based on an incorrect configuration, or the like. As shown by reference number 612, user interface 500 may provide the tooltip based on a mouse pointer hovering over a warning icon of toolbar 502.

As indicated above, FIG. 6 is provided merely as an example. Other examples are possible and may differ from what was described with regard to FIG. 6. For example, the digital paths displayed in FIG. 6 may be displayed in association with a particular color, a particular icon, or the like, in addition to, or as an alternative to, the particular patterns and/or icons.

FIGS. 7A-7E are diagrams of an example implementation 700 relating to example process 400 shown in FIG. 4 and/or user interface 500, shown in FIGS. 5A and 5B. FIGS. 7A-7E show an example of changing optical network information via a user interface. Assume that FIGS. 7A-7E show a set of digital paths for a particular digital service that is specified by a user of user device 230. Inventory window 506 of user interface 500 is omitted from FIGS. 7A-7E for clarity.

Figure 7A:
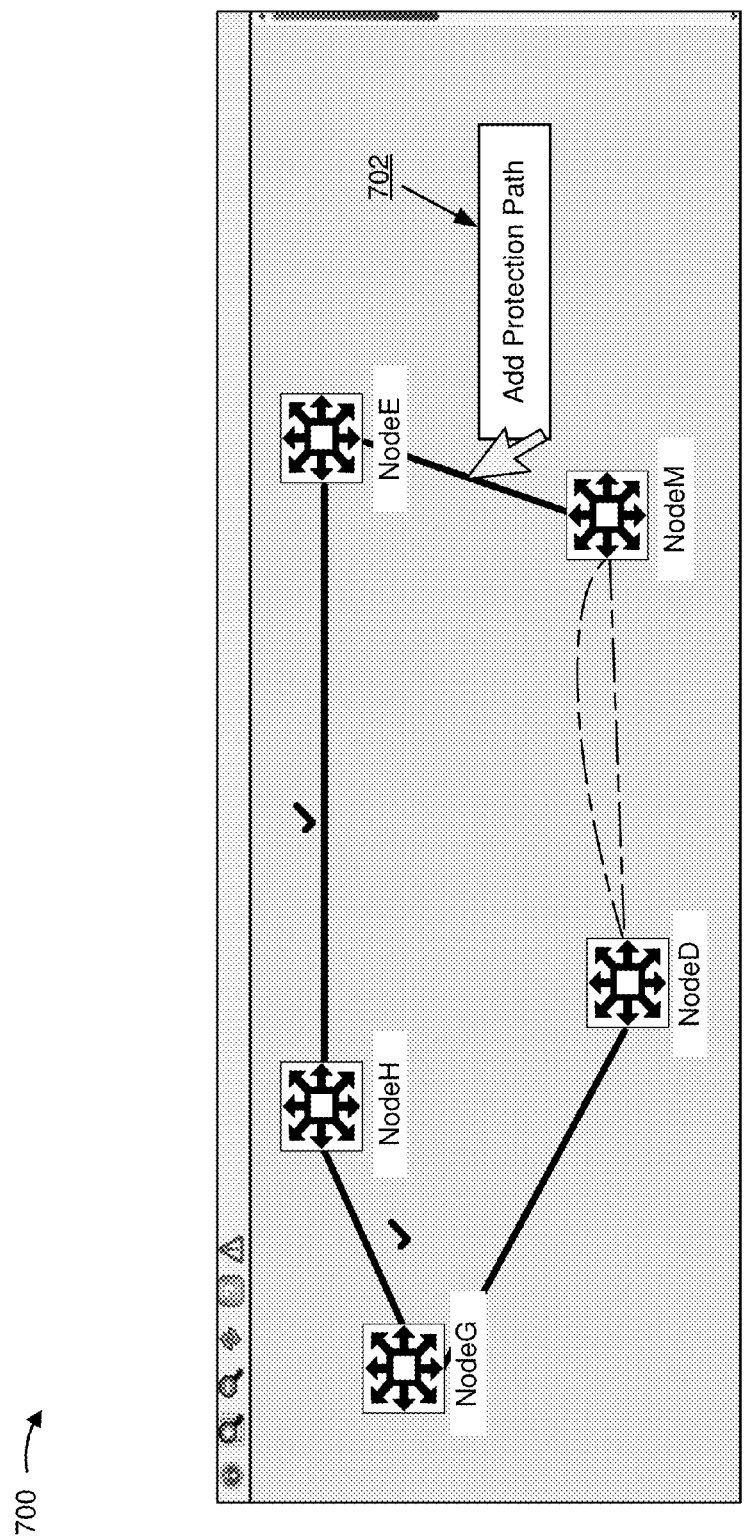
FIGS. 7A-7E are diagrams of an example implementation relating to the example process shown in FIG. 4.

As shown in FIG. 7A, user interface 500 may display the set of digital paths and optical network information related to the set of digital paths. As shown by reference number 702, network administrator device 220 may receive a user-specified change to the optical network information. Here, a user specifies to add a protection path between NodeE and NodeM of optical network 240. Assume that the user specifies to add the protection path by clicking on a graphical representation of the optical link between NodeE and NodeM, and by selecting an option to add the protection path from a menu.

Figure 7B:
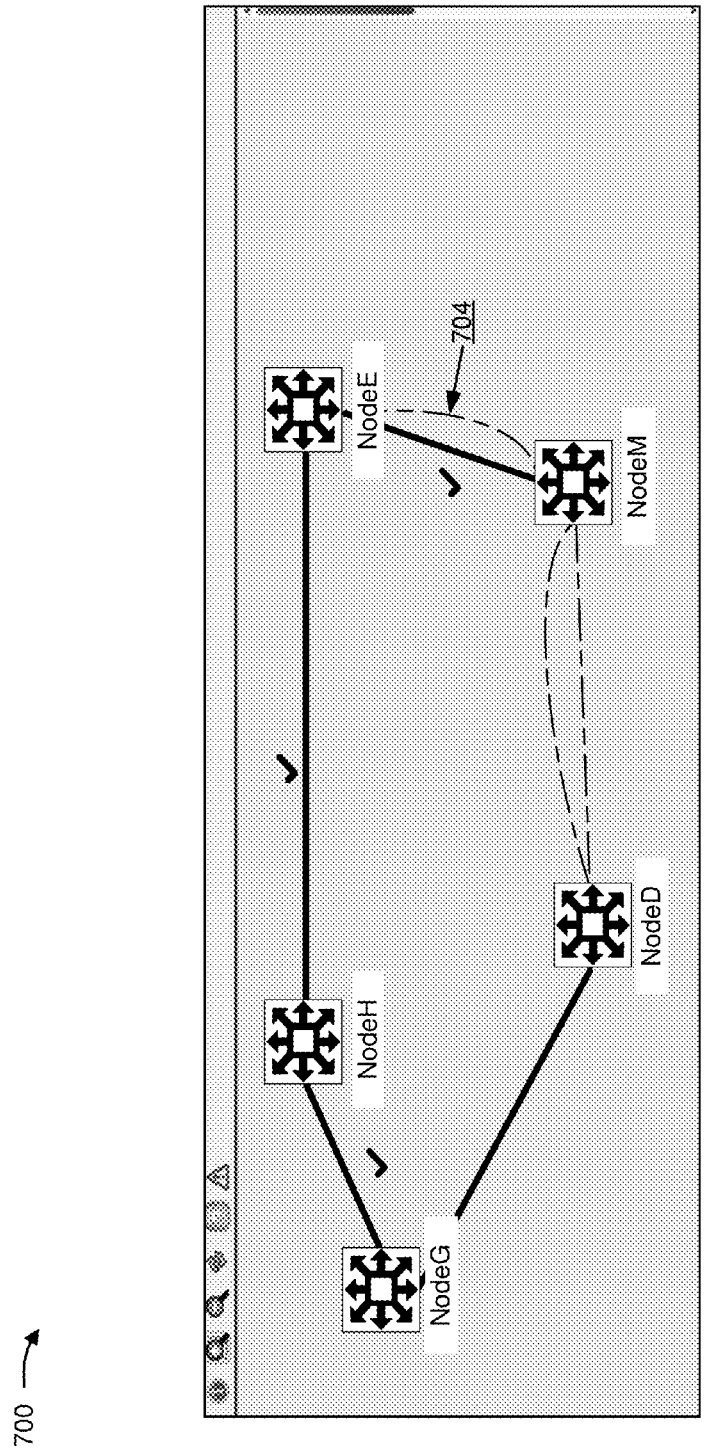

As shown in FIG. 7B, and by reference number 704, network administrator device 220 indicates that a protection path is added between NodeE and NodeM. Assume that network administrator device 220 adds the protection path between NodeE and NodeM by causing digital nodes 250, associated with NodeE and NodeM, to be configured according to the user-specified change, as described in more detail in connection with FIG. 7E, below.

Figure 7C:
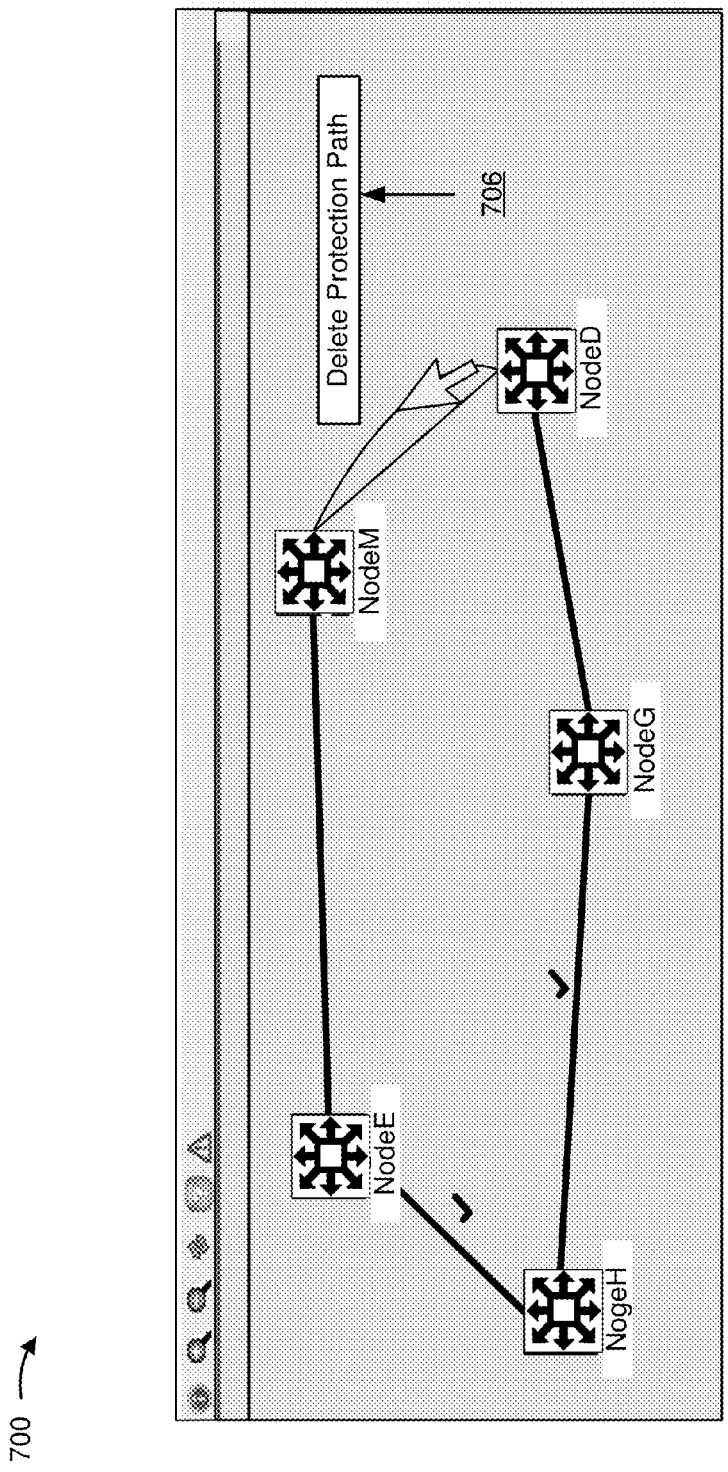

As shown in FIG. 7C, user interface 500 may display a set of digital paths and optical network information related to the set of digital paths. As shown by reference number 706, network administrator device 220 may receive a user-specified change to the optical network information. Here, a user specifies to remove a protection path between NodeD and NodeM of optical network 240. Assume that the user specifies to remove the protection path by clicking on a graphical representation of the protection path, and by selecting an option to remove the protection path from a menu.

Figure 7D:
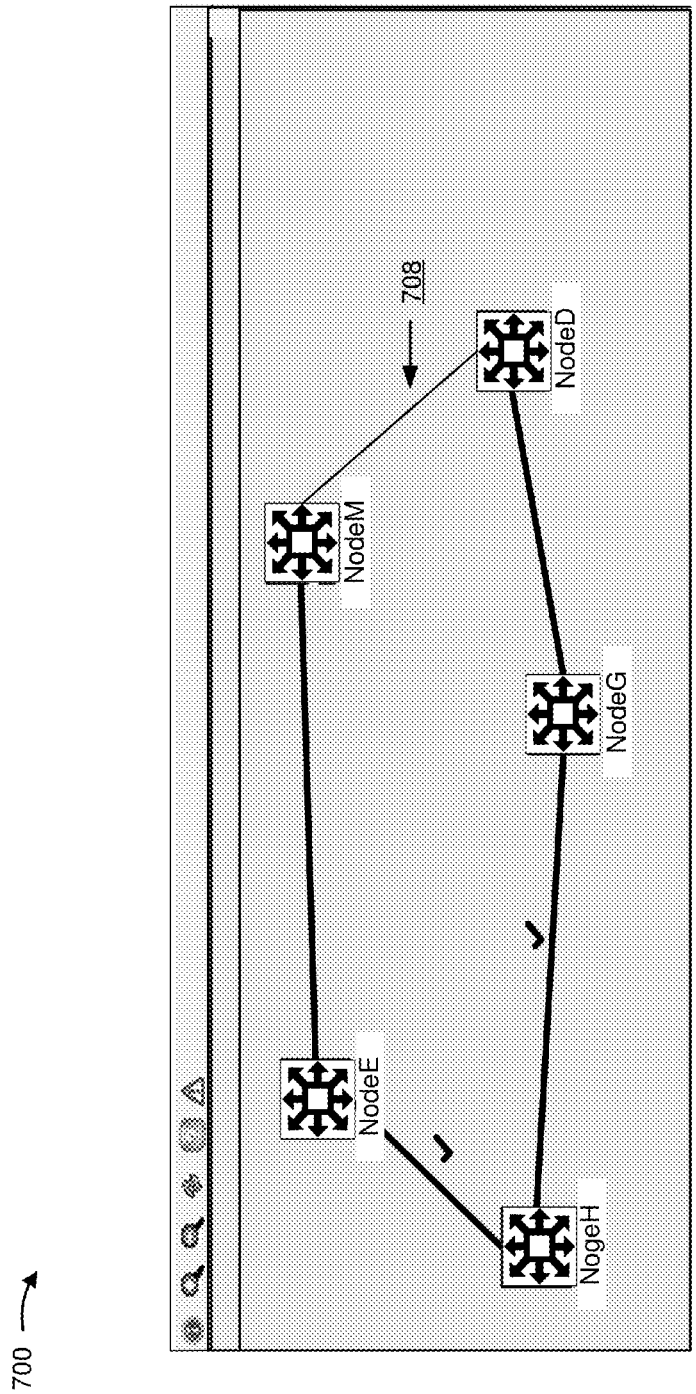

As shown in FIG. 7D, and by reference number 708, network administrator device 220 removes one of the protection paths between NodeD and NodeM. Assume that network administrator device 220 removes the protection path between NodeD and NodeM by causing digital nodes 250, associated with NodeD and NodeM, to be configured according to the user-specified change, as described in more detail in connection with FIG. 7E, below.

Figure 7E:
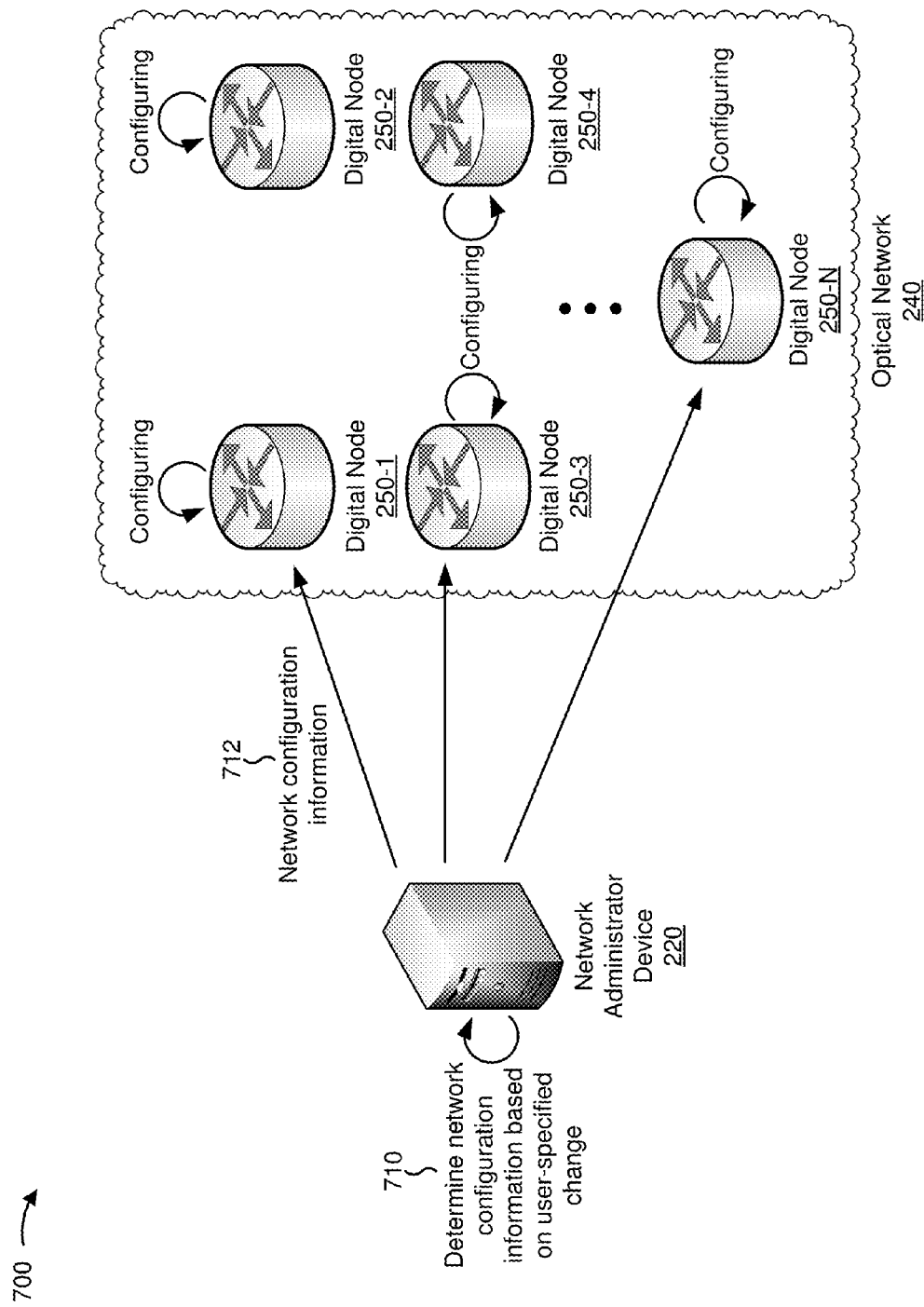

As shown in FIG. 7E, and by reference number 710, network administrator device 220 may determine network configuration information based on a user-specified change (e.g., an "add protection path" change, as shown in FIGS. 7A and 7B, a "remove protection path" change, as shown in FIGS. 7C and 7D, etc.). Assume that network administrator device 220 determines network configuration information that is readable by digital nodes 250-1 through 250-N, and assume that network administrator device 220 determines whether the user-specified change can be implemented in optical network 240 (e.g., based on digital nodes 250-1 through 250-N and/or based on a configuration of optical links between digital nodes 250-1 through 250-N). As shown by reference number 712, network administrator device 220 may provide the network configuration information to digital nodes 250-1 through 250-N. Digital nodes 250-1 through 250-N may correspond, for example, to NodeD, NodeE, NodeG, NodeH, and/or NodeM, shown in FIGS. 7A-7D.

As further shown, based on the network configuration information, digital nodes 250-1 through 250-N may be configured. In some implementations, digital nodes 250-1 through 250-N may receive the network configuration information, and may perform operations to configure digital nodes 250-1 through 250-N based on the network configuration information. Additionally, or alternatively, network administrator device 220 and/or network planning system 210 may perform operations to configure digital nodes 250-1 through 250-N.

In this way, network administrator device 220 may provide user interface 500, on which a user may view and/or modify working paths and protection paths of a digital service. Based on the user-specified changes to the working paths and/or protection paths, network administrator device 220 may cause optical network 240 to be configured, which may improve efficiency, decrease latency, and/or increase bandwidth of optical network 240.

As indicated above, FIGS. 7A-7E are provided merely as an example. Other examples are possible and may differ from what was described with regard to FIGS. 7A-7E.

FIGS. 8A-8G are diagrams of an example implementation 800 relating to example process 400 shown in FIG. 4. FIGS. 8A-8G shows an example of changing optical network information via a user interface. Assume that FIGS. 8A-8G show a set of digital paths for a particular digital service that is specified by a user of network administrator device 220. Inventory window 506 of user interface 500 is omitted from FIGS. 8A-8G for clarity.

Figure 8A:
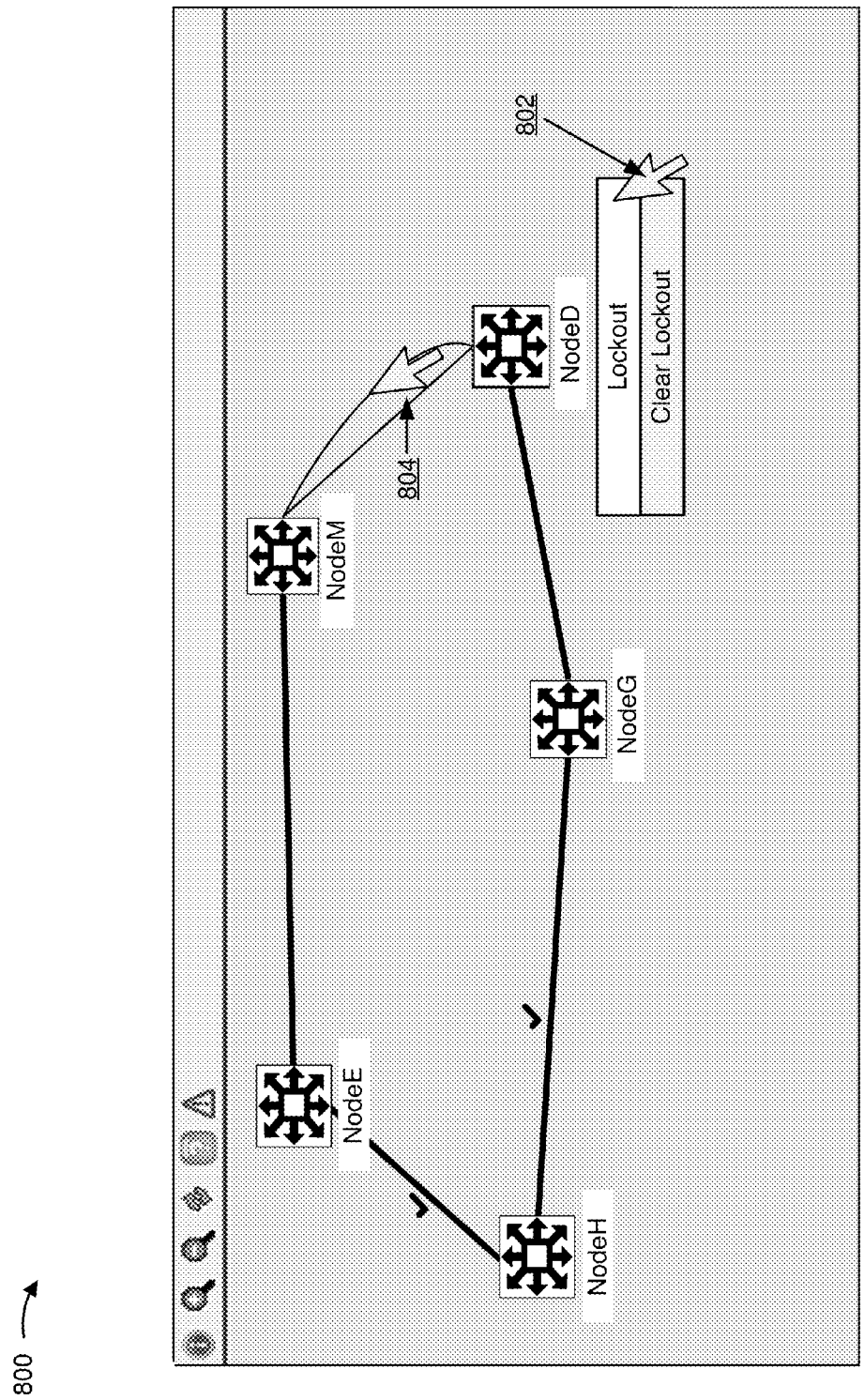
FIGS. 8A-8G are diagrams of an example implementation relating to the example process shown in FIG. 4.

As shown in FIG. 8A, and by reference number 802, a user may specify a "lockout" condition for a particular digital path. Here, as shown by reference number 804, the user specifies the "lockout" condition for a digital path between NodeD and NodeM. Assume that the user specifies the "lockout" condition by clicking the digital path between NodeD and NodeM, and by selecting the "lockout" button from a drop-down menu. The "lockout" condition may cause the digital service to be rerouted from the digital path between NodeD and NodeM, irrespective of whether a protection path is available to carry network traffic for the digital service.

Figure 8B:
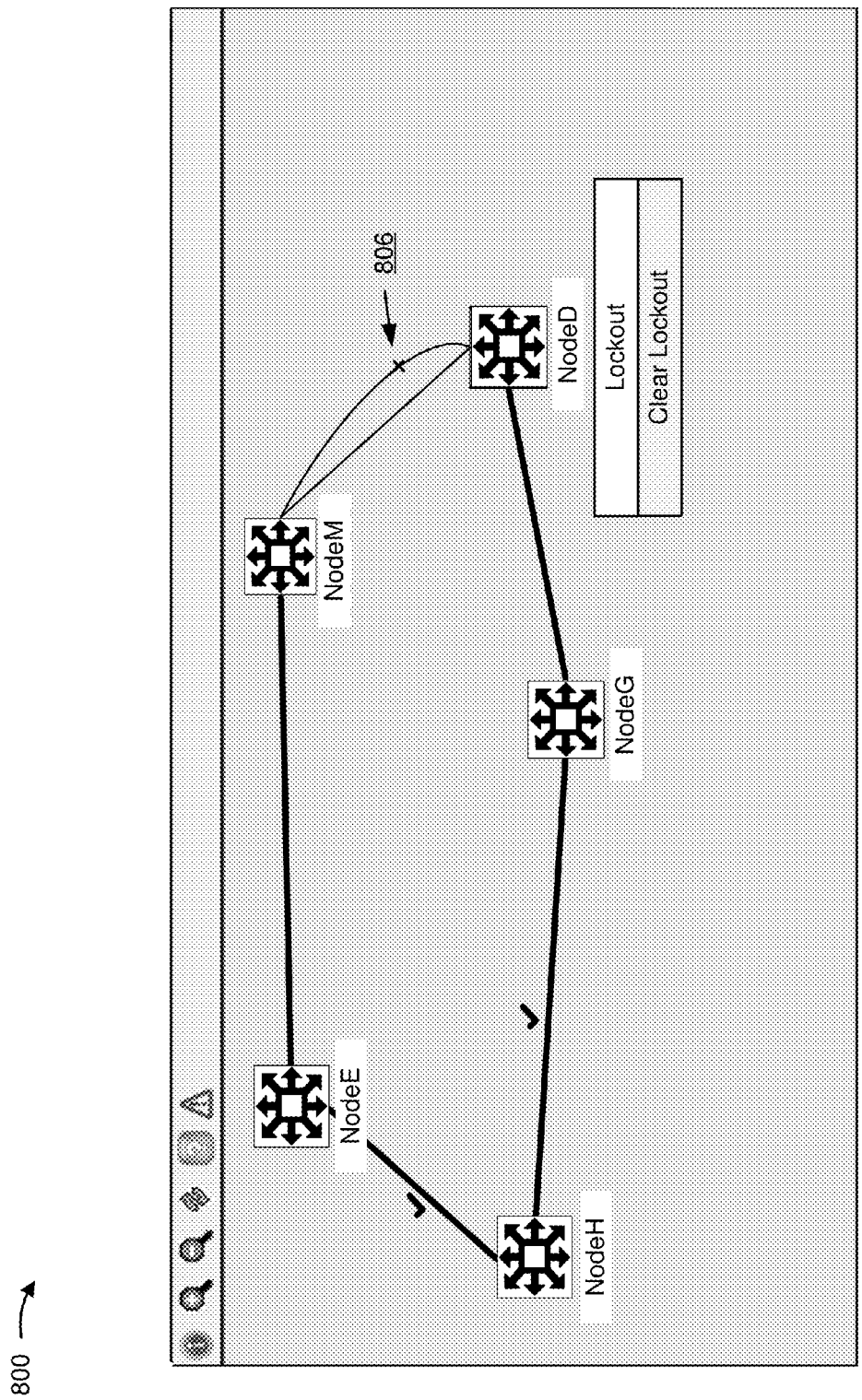

As shown in FIG. 8B, and by reference number 806, network administrator device 220 may indicate that the digital path between NodeD and NodeM is associated with the "lockout" condition (e.g., using an "x" icon, displayed in association with the digital path between NodeD and NodeM). Based on the user-specified "lockout" condition, network administrator device 220 may cause one or more digital nodes 250 to be configured, as described in more detail in connection with FIG. 8G.

Figure 8C:
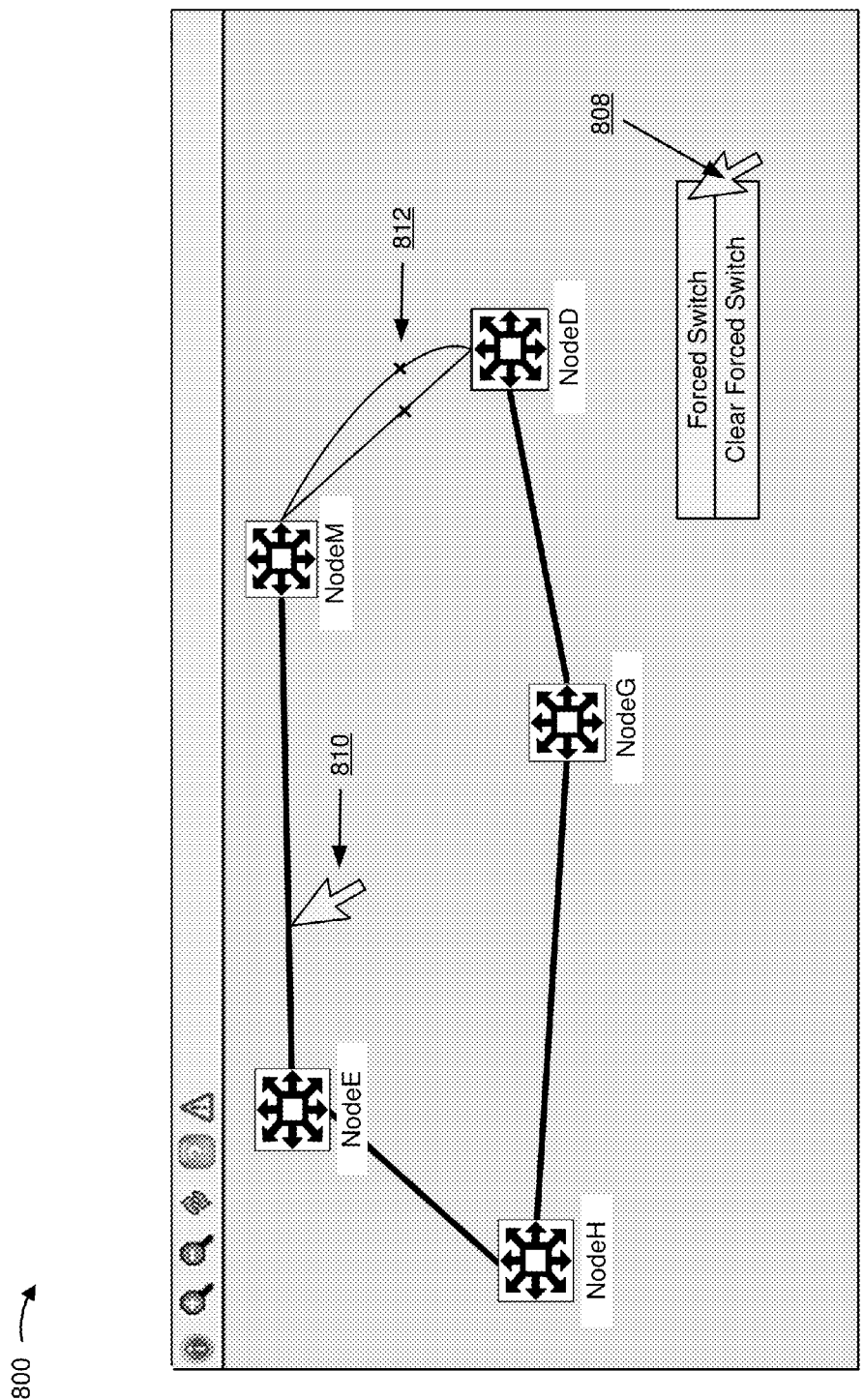

As shown in FIG. 8C, and by reference number 808, a user may specify a "forced switch" condition for a particular digital path. Here, as shown by reference number 810, the user specifies a digital path between NodeE and NodeM. Assume that the user specifies the "forced switch" condition by clicking the digital path between NodeE and NodeM, and by selecting the "forced switch" button from a drop-down menu. The "forced switch" condition may cause the digital service to be rerouted from the digital path between NodeE and NodeM, if a protection path is available for the digital service. If no protection path is available, the digital service will be provided via the digital path between NodeE and NodeM. As shown by reference number 812, the protection paths of the digital service are unavailable (e.g., physically interrupted, associated with a "lockout" condition, etc.).

Figure 8D:
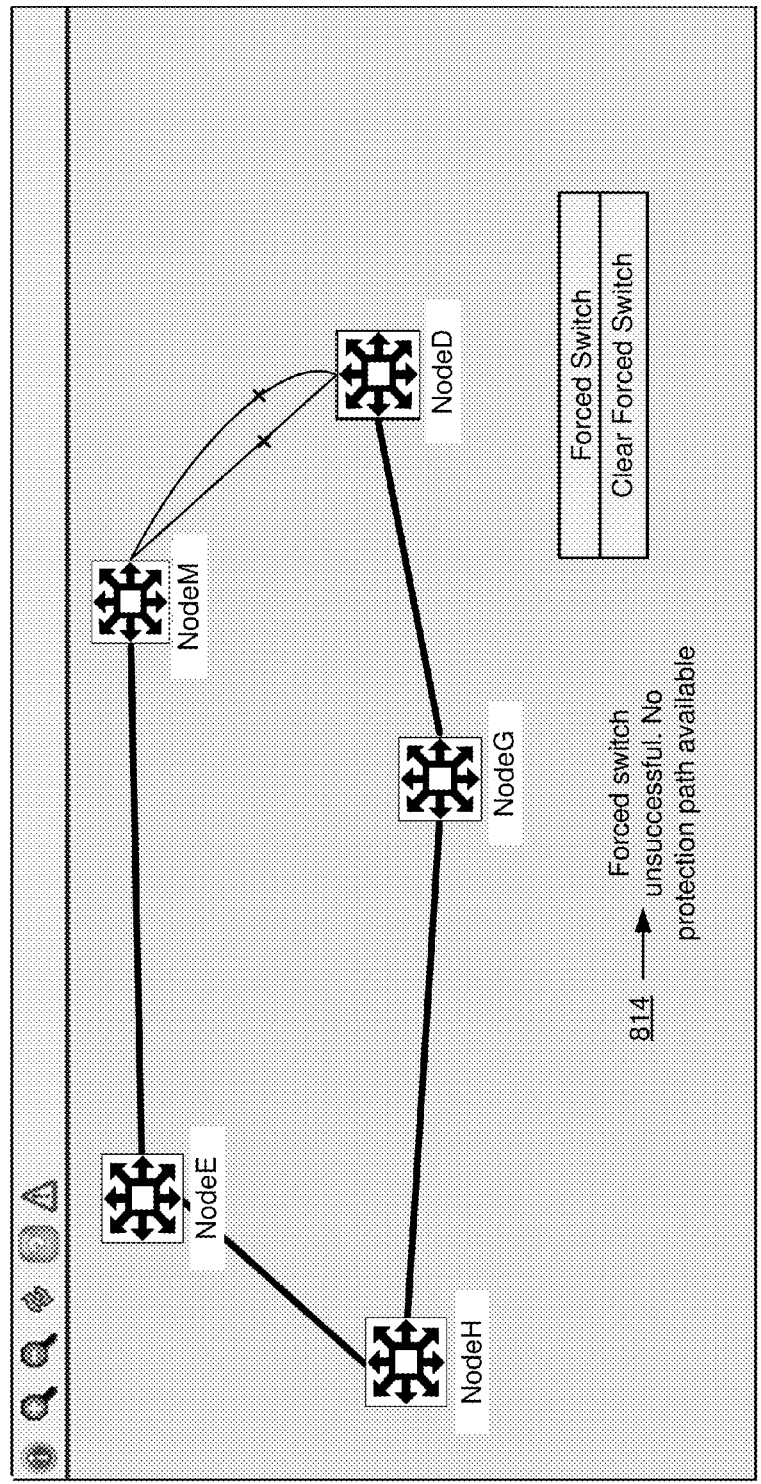

As shown in FIG. 8D, the digital service is not rerouted from the digital path between NodeE and NodeM. As shown by reference number 814, network administrator device 220 may provide information indicating that the "forced switch" condition was unsuccessful based on no protection path being available.

Figure 8E:
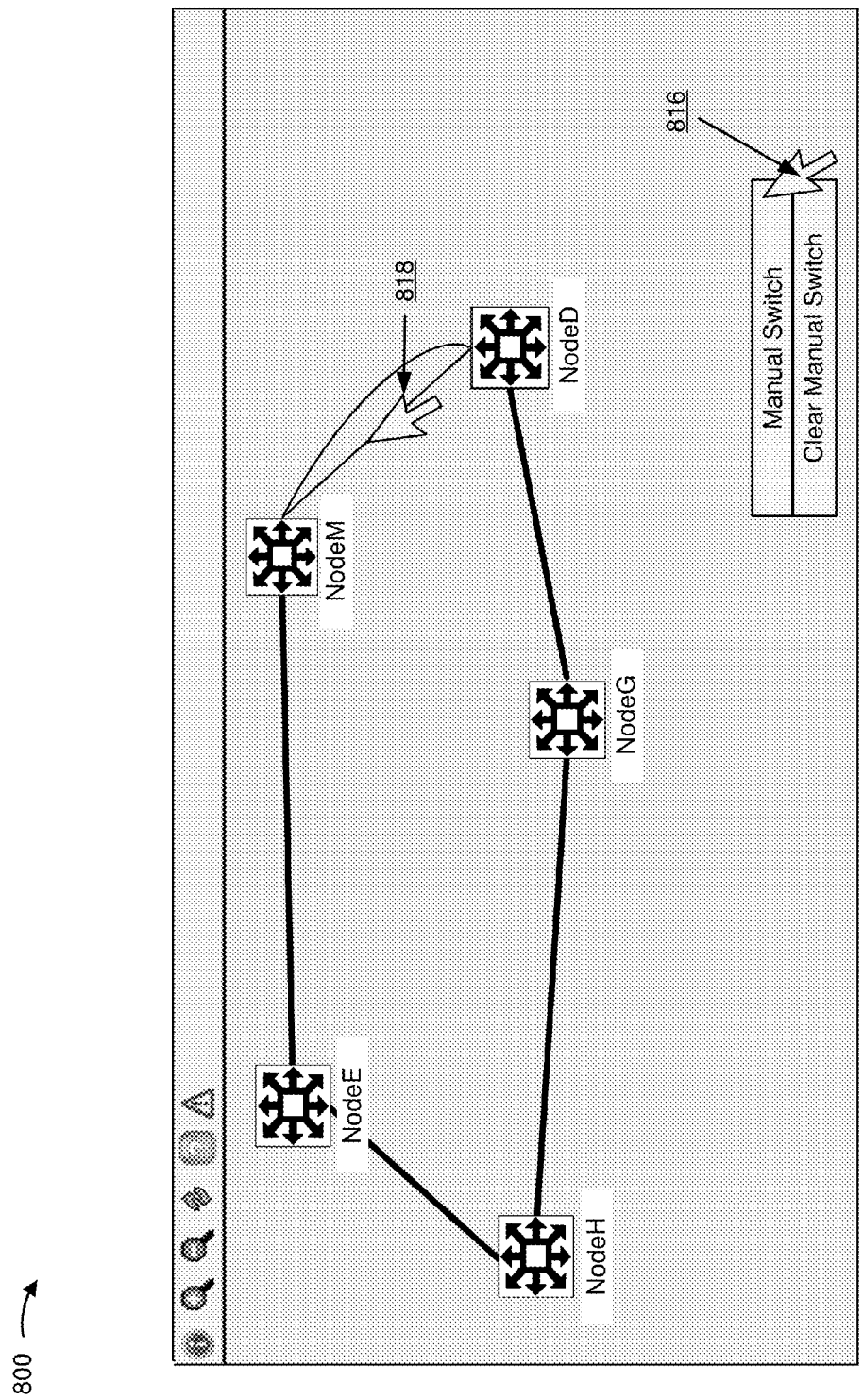

As shown in FIG. 8E, and by reference number 816, a user may specify a "manual switch" condition for a particular digital path. Here, as shown by reference number 818, the user specifies a digital path between NodeD and NodeM. Assume that the user specifies the "manual switch" condition by clicking the digital path between NodeD and NodeM, and by selecting the "manual switch" button from a drop-down menu. The "manual switch" condition may cause the digital service to be provided via the digital path between NodeD and NodeM.

Figure 8F:
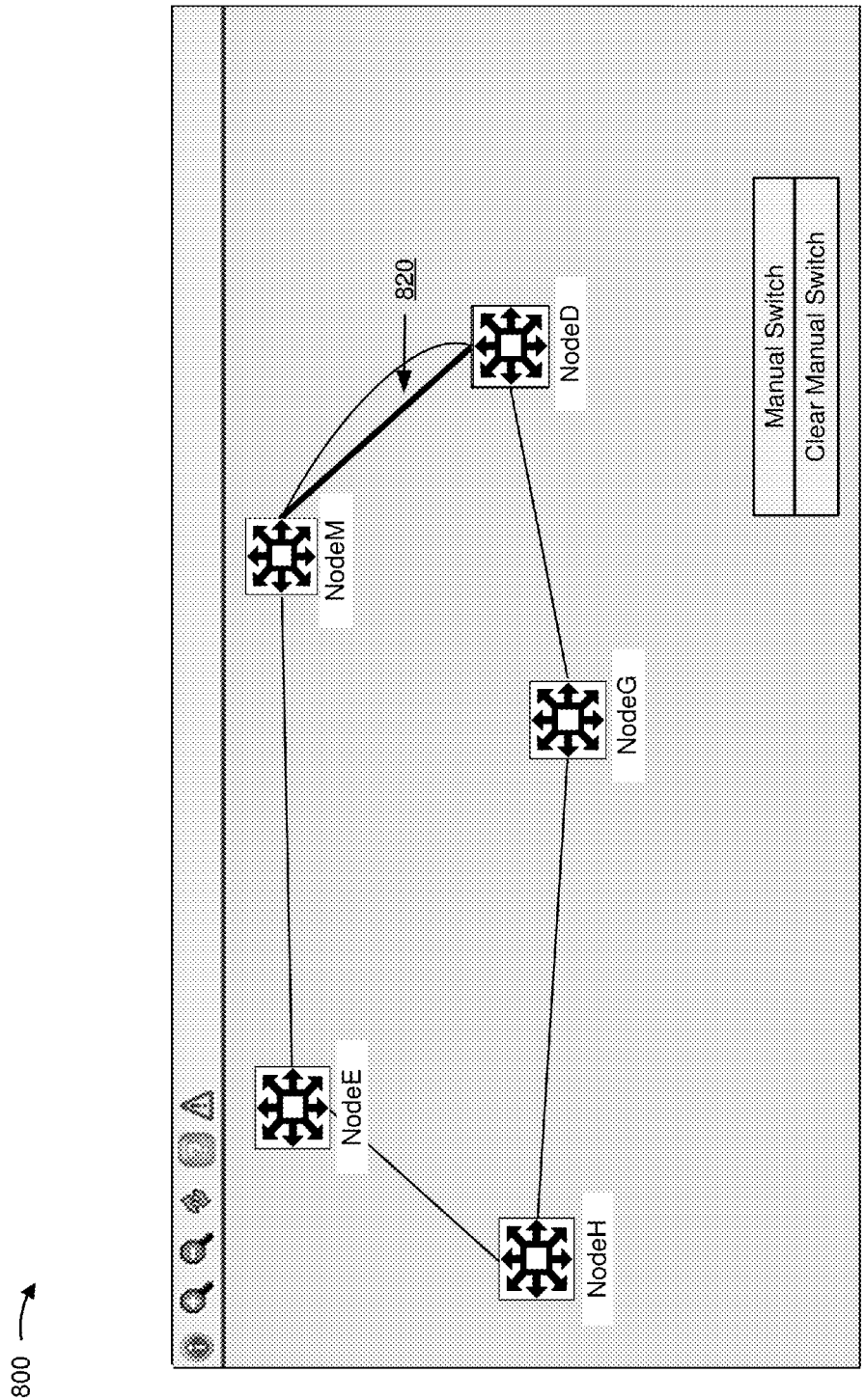

As shown in FIG. 8F, and by reference number 820, the digital service is provided via the digital path between NodeD and NodeM. In some implementations, network administrator device 220 may cause one or more digital nodes 250 to be configured based on the "manual switch" condition, as described in more detail in connection with FIG. 8G.

Figure 8G:
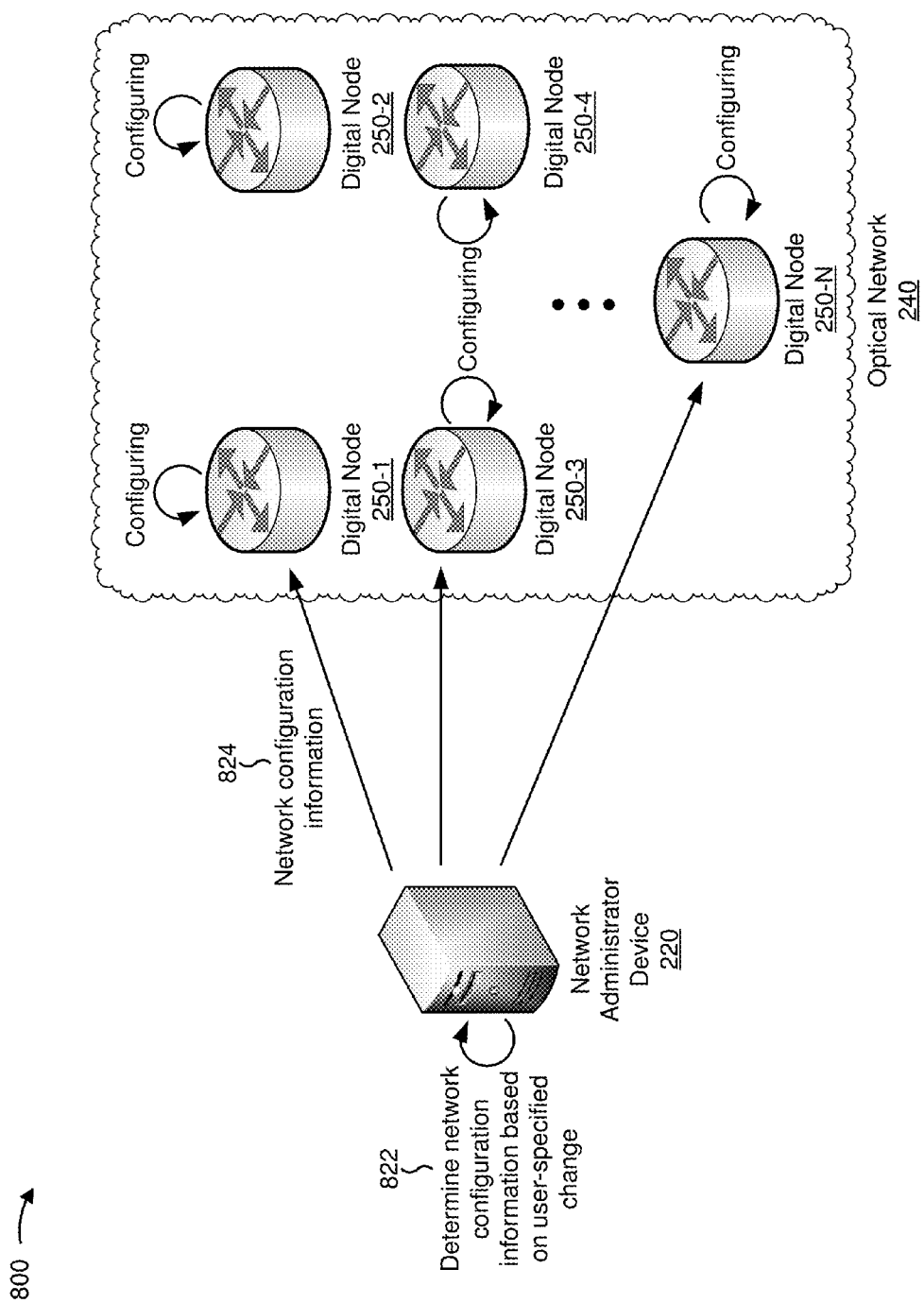

As shown in FIG. 8G, and by reference number 822, network administrator device 220 may determine network configuration information based on a user-specified change (e.g., a "lockout" condition, as shown in FIGS. 8A and 8B, a "forced switch" condition, as shown in FIGS. 8C and 8D, a "manual switch" condition, as shown in FIGS. 8E and 8F, or the like). Assume that network administrator device 220 determines network configuration information that is readable by digital nodes 250-1 through 250-N, and assume that network administrator device 220 determines whether the user-specified change can be implemented in optical network 240 (e.g., based on digital nodes 250-1 through 250-N and/or based on a configuration of optical links between digital nodes 250-1 through 250-N).

As shown by reference number 824, network administrator device 220 may provide the network configuration information to digital nodes 250-1 through 250-N. Digital nodes 250-1 through 250-N may correspond, for example, to NodeD, NodeE, NodeG, NodeH, and/or NodeM, shown in FIGS. 8A-8F.

As further shown, based on the network configuration information, digital nodes 250-1 through 250-N may be configured. In some implementations, digital nodes 250-1 through 250-N may receive the network configuration information, and may perform operations to configure digital nodes 250-1 through 250-N based on the network configuration information. Additionally, or alternatively, network administrator device 220 and/or network planning system 210 may perform operations to configure digital nodes 250-1 through 250-N. In this way, network administrator device 220 may provide user interface 500, on which a user may view and/or modify working paths and protection paths of a digital service. Based on the user-specified changes to the working paths and/or protection paths, network administrator device 220 may cause optical network 240 to be configured, which may improve efficiency, decrease latency, and/or increase bandwidth of optical network 240.

As indicated above, FIGS. 8A-8G are provided merely as an example. Other examples are possible and may differ from what was described with regard to FIGS. 8A-8G.

In this way, a network administrator device may decrease a quantity of time and/or effort used to determine digital paths of a digital service. The network administrator device, or another device, may modify digital nodes based on user-specified changes, which may simplify network administration, reduce time used in planning and/or modifying the digital paths, and reduce likelihood of error in modifying the digital paths. Further, modifying the digital nodes may improve efficiency, decrease latency, and/or increase bandwidth of the optical network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
obtain first information related to a digital service,
the first information identifying a digital path,
the digital path including digital nodes and optical links, of an optical network, to provide the digital service,
the digital service being provided via the digital path;
determine second information based on the first information,
the second information describing a relationship between one or more digital services and one or more digital paths,
the digital service being included in the one or more digital services, and
the digital path being included in the one or more digital paths;
provide a graphical representation, via a user interface, of the one or more digital paths;
provide the second information in relation to the graphical representation of the one or more digital paths;
detect a user interaction with an element of the graphical representation,
the element relating to one or more of the digital services and/or one or more of the digital paths; and
cause one or more of the digital nodes and/or the optical links to be configured based on the user interaction,
where the digital service is a first digital service; and
where the one or more processors, when determining the second information, are to:
determine that a particular optical link, of one of the one or more digital paths, is shared between the first digital service and a second digital service; and
where the one or more processors, when providing the second information, are to:
provide a visual indication that the particular optical link is shared between the first digital service and the second digital service,
where the one or more processors, when determining that the particular optical link is shared, are to:

determine that the second digital service is associated with a first priority level,
the first priority level being a higher priority level than a second priority level;
determine that the first digital service is associated with the second priority level; and
where the one or more processors, when providing the second information, are to:
provide a preemption indicator that visually indicates that the particular optical link is associated with the second digital service and the higher priority level.

2. The device of claim 1, where the one or more processors are to:
detect a user interaction with the visual indication that the particular optical link is shared; and
provide information related to the second digital service based on detecting the user interaction with the visual indication.

3. The device of claim 1, where the one or more processors are to:
detect a user interaction with a portion of the graphical representation; and
provide a subset of the second information related to the portion of the graphical representation.

4. The device of claim 1, where the first information is original first information; and
where the one or more processors are to:
obtain new first information,
the new first information relating to the one or more digital paths, and
the new first information being associated with a later point in time than the original first information;
update the second information based on the new first information; and
provide the updated second information in relation to the graphical representation.

5. The device of claim 4, where the one or more processors, when obtaining the new first information, are to:
obtain preemption information indicating that another digital service has preempted the digital service on a particular optical link; and
provide a visual indicator, in association with the particular optical link in the graphical representation, based on obtaining the preemption information.

6. A computer-readable medium storing instructions, the instructions comprising:
one or more instructions that, when executed by one or more processors, cause the one or more processors to:
obtain first information related to a digital service,
the first information identifying a plurality of digital paths,
the plurality of digital paths including digital nodes and optical links, of an optical network, to provide the digital service,
the digital service being provided via a first digital path of the plurality of digital paths;
determine second information based on the first information,
the second information identifying a relationship between one or more digital services and the plurality of digital paths;
provide a graphical representation of the plurality of digital paths via a user interface;
provide the second information in relation to the graphical representation of the plurality of digital paths,
detect a user interaction with an element of the graphical representation; and
cause one or more of the digital nodes to be configured based on the interaction,
where the digital service is a first digital service; and
where the one or more processors, when determining the second information, are to:
determine that a particular optical link, of one of the one or more digital paths, is shared between the first digital service and a second digital service; and
where the one or more processors, when providing the second information, are to:
provide a visual indication that the particular optical link is shared between the first digital service and the second digital service,
where the one or more processors, when determining that the particular optical link is shared, are to:
determine that the second digital service is associated with a first priority level,
the first priority level being a higher priority level than a second priority level;
determine that the first digital service is associated with the second priority level; and
where the one or more processors, when providing the second information, are to:
provide a preemption indicator that visually indicates that the particular optical link is associated with the second digital service and the higher priority level.

7. The computer-readable medium of claim 6, where the one or more instructions, that cause the one or more processors to determine the second information, cause the one or more processors to:
determine that the digital service can be provided via a second digital path of the plurality of digital paths,
the second digital path including a first digital node and a second digital node that are included in a portion of the first digital path; and
provide a visual indicator, in the graphical representation and in association with the portion of the first digital path, indicating that the digital service can be provided via the second digital path.

8. The computer-readable medium of claim 6, where the one or more instructions, that cause the one or more processors to detect the interaction, cause the one or more processors to:
detect the interaction with a portion of the graphical representation,
the interaction specifying to add a second digital path, the second digital path being different than the first digital path; and
where the one or more instructions, that cause the one or more processors to cause the one or more of the digital nodes to be configured, further cause the one or more processors to:
cause one or more digital nodes, that correspond to the portion of the graphical representation, to be configured to provide the second digital path.

9. The computer-readable medium of claim 6, where the one or more instructions, that cause the one or more processors to detect the user interaction, cause the one or more processors to:
detect the user interaction with a portion of the graphical representation corresponding to a portion of the first digital path,
the user interaction specifying to reroute the digital service from the portion of the first digital path to a portion of a second digital path; and where the one or more instructions, that cause the one or more processors to cause the one or more of the digital nodes to be configured, further cause the one or more processors to:
cause one or more digital nodes, that correspond to the portion of the first digital path and the portion of the second digital path, to be configured to reroute the digital service to the portion of the second digital path.

10. The computer-readable medium of claim 6, where the one or more instructions, that cause the one or more processors to provide the second information in relation to the graphical representation, further cause the one or more processors to:
provide an availability indicator in relation to a portion of the graphical representation corresponding to a portion of a particular digital path of the plurality of digital paths,
a first state of the availability indicator indicating that the portion of the particular digital path is unavailable to provide the digital service,
a second state of the availability indicator indicating that the portion of the particular digital path is providing the digital service,
a third state of the availability indicator indicating that the portion of the particular digital path is providing the digital service and a second digital service, and
a fourth state of the availability indicator indicating that the portion of the particular digital path is available to provide the digital service, and
the availability indicator indicating one of the first state, the second state, the third state, or the fourth state.

11. The computer-readable medium of claim 6, where the one or more instructions, that cause the one or more processors to obtain the first information, further cause the one or more processors to:
obtain the first information based on receiving a request for a user interface relating to the digital service.

12. The computer-readable medium of claim 6, where the element of the graphical representation corresponds to a particular optical link; and
where the graphical representation is provided via a first portion of the user interface; and
where the one or more instructions, that cause the one or more processors to detect the user interaction with the element, further cause the one or more processors to:
provide, via a second portion of the user interface, information identifying one or more digital services associated with the particular optical link.

13. A method, comprising:
obtaining, by a device, first information relating to a digital service,
the first information identifying a plurality of digital paths,
the plurality of digital paths including digital nodes and optical links, of an optical network, to provide the digital service,
the digital service being provided via a first digital path, of the plurality of digital paths;
determining, by the device, second information based on the first information,
the second information identifying a relationship between two or more of the plurality of digital paths;
providing, by the device and via a user interface, a graphical representation of the plurality of digital paths,
elements of the graphical representation corresponding to respective optical links or digital nodes of the plurality of digital paths; and
providing, by the device and via the user interface, the second information in relation to the graphical representation of the plurality of digital paths,
the second information relating to a particular optical link, of the optical links or a particular digital node, of the digital nodes, and
the second information being provided in relation to a portion of the graphical representation corresponding to the particular optical link or the particular digital node,
where the digital service is a first digital service; and
when determining the second information, determine that a particular optical link, of one of the one or more digital paths, is shared between the first digital service and a second digital service; and
when providing the second information, provide a visual indication that the particular optical link is shared between the first digital service and the second digital service,
when determining that the particular optical link is shared, determine that the second digital service is associated with a first priority level,
the first priority level being a higher priority level than a second priority level;
determine that the first digital service is associated with the second priority level; and
when providing the second information, provide a preemption indicator that visually indicates that the particular optical link is associated with the second digital service and the higher priority level.

14. The method of claim 13, further comprising:
receiving, via the user interface, a user interaction with a particular portion of the graphical representation,
the particular portion corresponding to the particular optical link or the particular digital node;
identifying a plurality of digital services associated with the particular optical link or digital node; and
providing information identifying the plurality of digital services.

15. The method of claim 14, further comprising:
determining that the plurality of digital services are associated with a shared risk resource group based on being associated with the particular optical link or the particular digital node; and
providing information indicating that the plurality of digital services are associated with the shared risk resource group.

16. The method of claim 13, where the first information is original first information, and
where the method further comprises:
receiving new first information related to the particular optical link or the particular digital node,
the new first information being different than the original first information, and
the new first information being received after the original first information; and
modifying an element of the graphical representation, corresponding to the particular optical link or the particular digital node, based on the new first information.

17. The method of claim 13, further comprising:
receiving a user-specified change to one or more elements of the graphical representation corresponding to the particular optical link or the particular digital node; and
causing the particular optical link or the particular digital node to be configured based on the user-specified change.

18. The method of claim 13, where providing the graphical representation comprises:
providing the graphical representation to a user device.

\* \* \* \* \*